United States Patent [19]

Tsukamoto et al.

[11] Patent Number: 4,726,541
[45] Date of Patent: Feb. 23, 1988

[54] EMERGENCY LOCKING RETRACTOR

[75] Inventors: Masahiro Tsukamoto; Kazumi Hirata, both of Kanagawa, Japan

[73] Assignee: NSK Warner K.K., Tokyo, Japan

[21] Appl. No.: 848,148

[22] Filed: Apr. 4, 1986

[30] Foreign Application Priority Data

Apr. 10, 1985 [JP] Japan ............................... 60-52093[U]
Nov. 6, 1985 [JP] Japan ............................. 60-169791[U]

[51] Int. Cl.[4] ............................................. B60R 22/38
[52] U.S. Cl. ........................ 242/107.4 B; 242/107.4 A
[58] Field of Search ................. 242/107.4 B, 107.4 A; 280/806; 297/478, 480

[56] References Cited

U.S. PATENT DOCUMENTS

| | | | |
|---|---|---|---|
| 4,456,195 | 6/1984 | Takada .......................... | 242/107.4 B |
| 4,560,115 | 12/1985 | Toyama et al. ........... | 242/107.4 B X |
| 4,564,154 | 1/1986 | Takada ..................... | 242/107.4 A X |

FOREIGN PATENT DOCUMENTS 55-37139  9/1980  Japan .
2132070A  7/1984  United Kingdom .

*Primary Examiner*—John M. Jillions
*Attorney, Agent, or Firm*—Wegner & Bretschneider

[57] ABSTRACT

A emergency locking retractor includes a reel equipped with cogs; lock means capable of assuming any one of a reel-locking position, an intermediate position where the lock means is in engagement with one of the cogs of the reel but still allows the reel to rotate slightly, and a reel non-locking position; first biasing means holding the lock means normally at the non-locking position; an inertia member; second biasing means for normally allowing the inertia member to rotate together with the reel; transmission means for transmitting rotation of the reel to the lock means when the inertia member moves relative to the reel, whereby the lock means is caused to return from the non-locking position to the intermediate position against the first biasing means; and means for permitting the release of connection between the inertia member and transmission means by the second biasing means when the lock means is forced to move to the locking position by a further slight rotation of the reel subsequent to a displacement of the lock means to the intermediate position by the transmission means.

29 Claims, 35 Drawing Figures

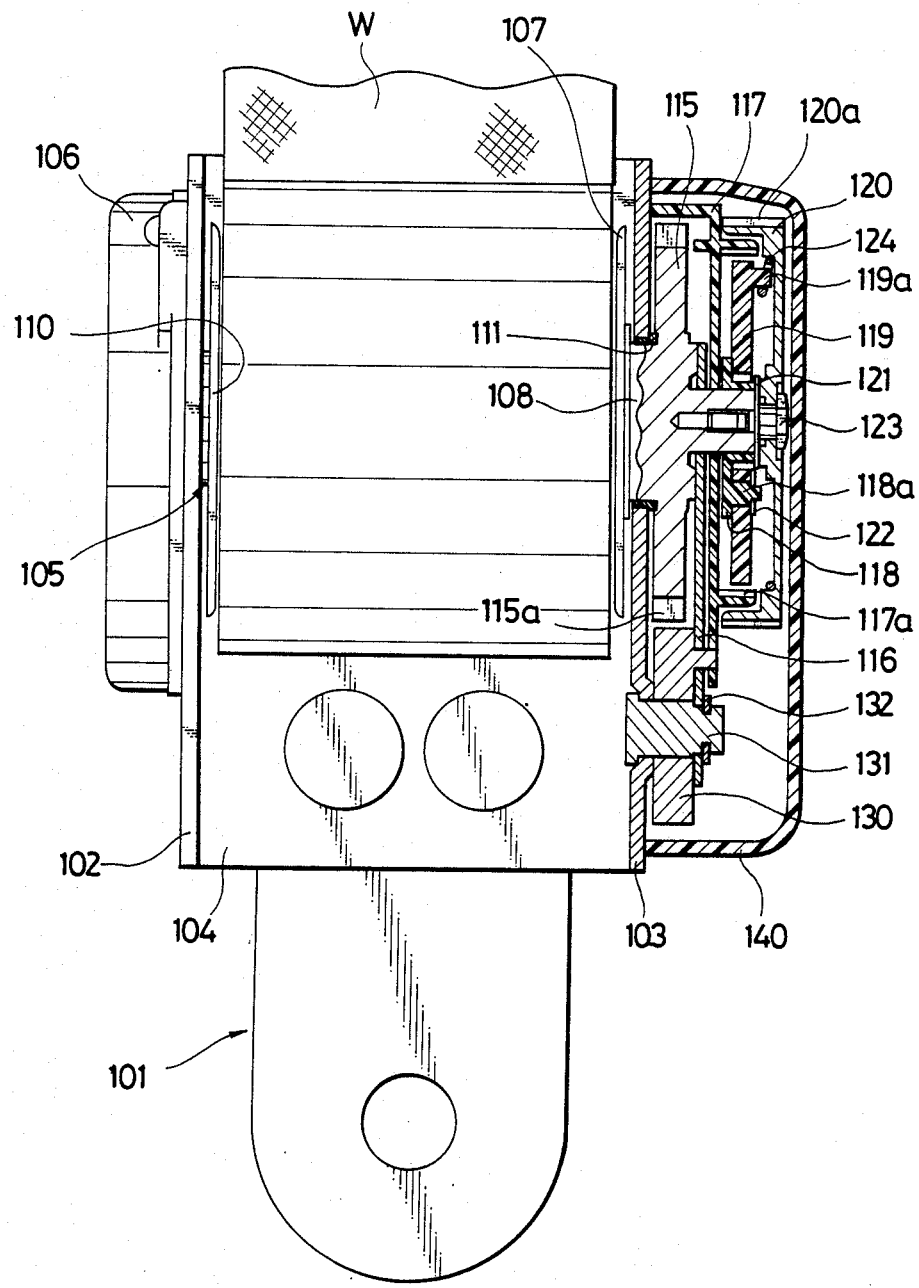

EMERGENCY LOCKING RETRACTOR

BACKGROUND OF THE INVENTION

1. Field of the Invention

This invention relates to a webbing retractor equipped with an emergency locking mechanism and suitable for use in an aircraft, car or the like, and more specifically to an emergency locking retractor permitting easy release of a webbing from its lockup state.

2. Description of the Prior Art

Known emergency locking retractors may generally be classified into two types, one being the vehicle sensing type in which a webbing is locked by sensing an acceleration of a vehicle body in the event of an emergency and the other being the webbing sensing type in which the locking of a webbing is effected by sensing an abrupt release of the webbing in the event of an emergency. Of these two types of emergency locking retractors, webbing-sensing emergency locking retractors are in many instances of such a design that an inertia member is attached to a shaft, on which a webbing is taken up, rotatably relative to the shaft and by making use of a relative rotation developed between the shaft and inertia member upon an abrupt release of the webbing, a pawl is brought into engagement with a ratchet plate provided coaxially on the shaft so as to prevent any further rotation of the shaft. In such an emergency locking retractor, the webbing is promptly taken up by a take-up spring provided with the shaft and is received over the entire length thereof within the retractor upon release of the buckle by an occupant. Here, the rotation of the shaft is stopped suddenly while the inertia member tends to continue its rotation owing to its own inertia. A relative rotation is thus developed between the shaft and the inertia member, thereby bringing about such a state that the pawl is engageable with the ratchet plate. Since the shaft is caused to rotate slightly in the webbing-releasing direction owing to a counter-reaction to the sudden stop, the above-established state is enhanced further and in relatively many instances, the so-called lockup state permitting neither release nor take-up of the webbing is resulted. Such a lockup state also occurs in the case of an emergency locking retractor of the vehicle sensing type (for example, when its sensor is actuated by an impact upon taking up the webbing). In order to release the above lockup state, it is necessary to disassemble the retractor in the worst case. This is extremely inconvenient.

SUMMARY OF THE INVENTION

With the foregoing in view, the present invention has as its object the provision of an emergency locking retractor which permits release of a lockup state by a simple mechanism.

In one aspect of this invention, there is provided an emergency locking retractor comprising:
a casing;
a reel supported rotatably on the casing and biased in the webbing-winding direction, said reel including a plurality of cogs which are each equipped with an interlocking face directed in the webbing-releasing direction;
lock means capable of assuming any one of a locking position where the lock means prevents the reel from rotating in the webbing-releasing direction, an intermediate position where the lock means is in engagement with the interlocking face of one of the cogs of the reel but still allows the reel to rotate to a certain limited extent, and a non-locking position where the lock means is maintained out of engagement from any one of the cogs of the reel;
first biasing means connected to the lock means and normally holding the lock means at the non-locking position;
an inertia member normally rotatable together with the reel but when the revolution speed of the reel has changed beyond a predetermined level, displaceable relative to the reel;
second biasing member for biasing the inertia member in such a way that the inertia member is normally allowed to rotate together with the reel;
transmission means for transmitting rotation of the reel to the lock means when the inertia member undergoes a displacement relative to the reel, whereby the lock means is caused to return from the non-locking position to the intermediate position against the first biasing means; and
means for permitting the release of connection between the inertia member and transmission means owing to the action of the second biasing means when the lock means is forced to move to the locking position by a further slight rotation of the reel subsequent to a displacement of the lock means to the intermediate position by the transmission means.

In another aspect of this invention, there is also provided an emergency locking retractor comprising:
a casing;
a reel supported rotatably on the casing and biased in the webbing-winding direction, said reel including a plurality of cogs;
lock means displaceable between an engagement position, where the lock means is maintained in engagement with one of the cogs of the reel, and a non-engagement position where the lock means is maintained out of engagement from any one of the cogs of the reel;
first biasing means connected to the lock means and normally holding the lock means at the non-engagement position;
an inertia member normally rotatable together with the reel but when the revolution speed of the reel has changed beyond a predetermined level, displaceable relative to the reel;
second biasing member for biasing the inertia member in such a way that the inertia member is normally allowed to rotate together with the reel;
transmission means for transmitting rotation of the reel to the lock means when the inertia member undergoes a displacement relative to the reel; and
means for permitting the release of connection between the inertia member and transmission means owing to the action of the second biasing means when the lock means has been caused to move to the engagement position by the transmission means.

In the above emergency locking retractor of this invention, its lockup state can be released easily without failure by the simple mechanism. Thus, the present invention provides at a low manufacturing cost an emergency locking retractor which assures stable actuation for its emergency locking mechanism and is allowed to escape easily and surely from its lockup without need for its disassembly.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIG. 14 is a partially cross-sectional front view of an emergency locking retractor according to the fifth embodiment of this invention;

DETAILED DESCRIPTION OF THE INVENTION AND PREFERRED EMBODIMENTS

Figure 1:
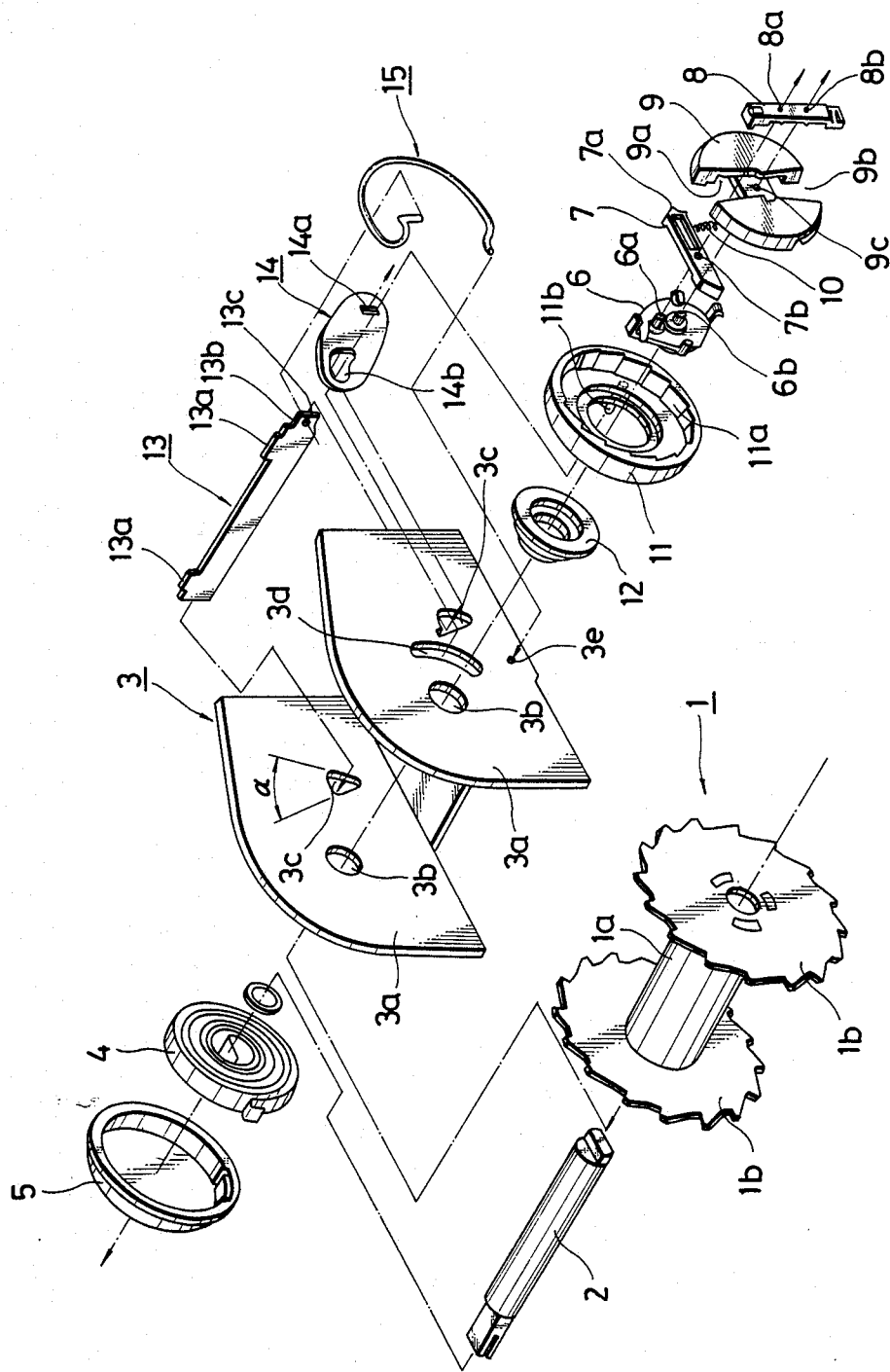
FIG. 1 is an exploded perspective view of an emergency locking retractor according to the first embodiment of this invention.
Figure 2:
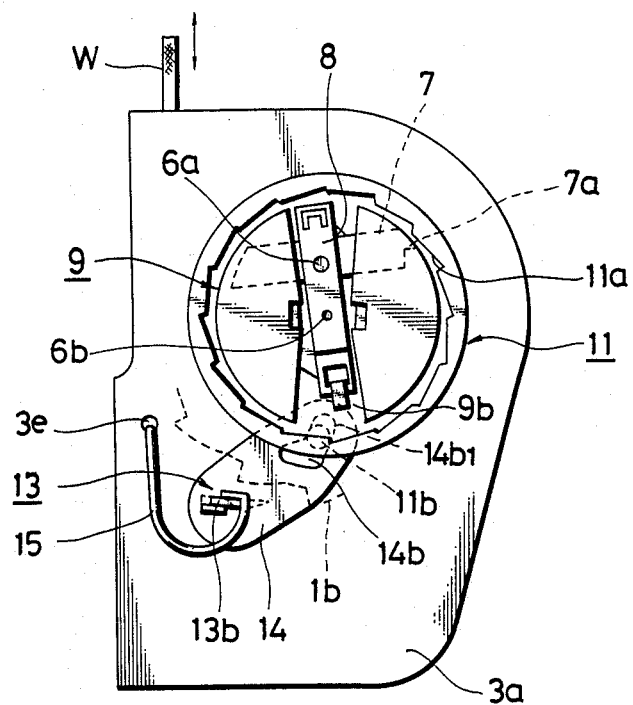
FIG. 2 is a side view of the first embodiment.

The first embodiment of this invention is now described with reference to FIGS. 1 through 5. A reel 1, which serves to take up a webbing W thereon, is composed of a cylinder 1a and cog wheels 1b fixedly mounted on both ends of the cylinder 1a. A number of ratchet cogs, each of which has an interlocking surface directed in the webbing-releasing direction, are formed at an equal interval on the entire periphery of each of the cog wheels 1b. The reel 1 is fit over a spindle 2 and is rotatable together with the spindle 2. The spindle 2 with the reel 1 fit thereon is inserted in and rotatably supported by spindle holes 3b, 3b formed through opposing side walls 3a, 3a of a retractor casing 3 which is formed, for example, in the shape of a square U.

A coil spring 4 for biasing the spindle 2 and reel 1 so as to cause them to rotate in the webbing-winding direction is mounted on one end portion of the spindle 2, which end portion extends out from the side wall 3a. The coil spring 4 is covered by a cup-shaped cover 5.

Both ends of the coil spring 4 are hooked respectively on the spindle 2 and a suitable point on the inner peripheral surface of the cover 5.

On the other end portion of the spindle 2, there is mounted a clutch mechanism which selectively transmits rotation of the spindle to below-described lock means when the revolution of the spindle 2 has changed beyond a predetermined level. In the illustrated first embodiment, the clutch mechanism has such a structure that a driving unit composed of a flange 6, a pawl 7 as a lock member, a retainer flange 8 and an inertia block 9 as an inertia member is detachably connected to a ratchet cup 11 as a driven member by means of the pawl 7. The spindle 2 is formed at one extremity into an oval shape in transverse cross-section. The flange 6 is fit on the oval-shaped extremity of the spindle 2 in such a way that the flange 6 is rotatable as a unitary member with the spindle 2. On the outer wall of the flange 6, two shafts 6a, 6b are provided perpendicular to the plane of the flange 6. The pawl 7 with a sharp interlocking edge 7a formed at one end thereof is rotatably fit over one of the shafts, i.e., the shaft 6a by way of a bore 7b formed substantially at the center of the pawl 7. The outer end of the shaft 6a is rotatably inserted in hole 8a formed through the retainer flange 8 as a stopper. On the other shaft 6b, the disk-shaped inertia block 9 with a groove 9a receiving the pawl 7, retainer flange 8, etc. therein and a notch 9b, both formed in the inertia block 9, is rotatably fit over the other shaft 6b by way of a shaft hole 9c formed centrally through the inertia block 9. Similar to the shaft 6a, the outer end of the shaft 6b is rotatably inserted in the other hole 8b formed through the retainer flange 8.

Figure 3:
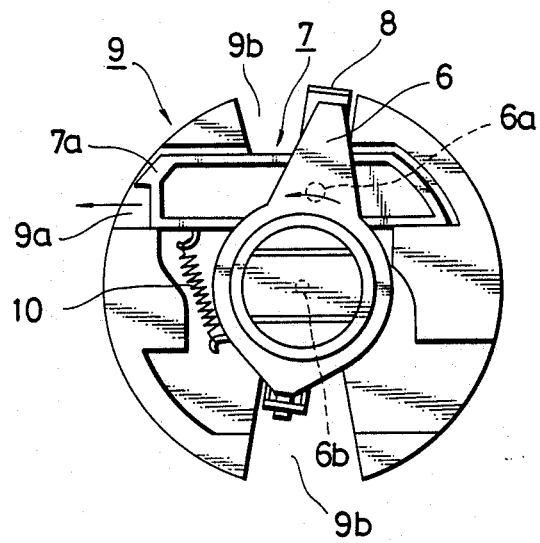
FIGS. 3, 4a and 4b are schematic fragmentary views of the first embodiment.

FIG. 3 illustrates the flange 6, pawl 7, retainer flange 8 and inertia block 9 in their assembled form, as viewed from the side of the spindle 2. In FIG. 3, a helical spring 10 is applied as second biasing means between a suitable point on the pawl 7 received in the groove 9a of the inertia block 9 and a corresponding suitable point on the flange 6. The former point is located on the side of the interlocking edge 7a. Accordingly, when the webbing-releasing speed changes beyond the predetermined level, the inertia block 9 cannot follow the rotation (indicated by an arrow) of the spindle 2 and flange 6 due to its own inertia and undergoes a delay in rotation relative to the flange 6. As a result, the flange 6 is caused to turn relative to the block 9 about the shaft 6b within the angular width of the notch 9b. Hence, the pawl 7 through which the shaft 6a extends is caused to slide in a direction indicated by an arrow against the pulling force of the helical spring 10, thereby causing the interlocking edge 7a to project out from the block 9.

Referring back to FIG. 1, the assembled unit of the flange 6, pawl 7, inertia block 9 and retainer flange 8 is received in the ratchet cup 11 in the form of a short cylinder, which is rotatably fit over the spindle 2. Ratchet teeth 11a are formed at an equal interval on the entire peripheral surface of the side wall of the ratchet cup 11. Here, the number of the ratchet teeth 11a is either equal to or an integer multiple of the number of cogs of the cog wheel 1b. As a result, when the ratchet cup 11 turns over a predetermined angle subsequent to the engagement of the pawl 7 and one of the ratchet teeth 11a, interlocking lugs 13a, 13a of a lock lever 13 (i.e., lock means) which will be described herein and is turned by a lock arm 14, which will also be described herein, are caused to engage a desired pair of cogs of the cog wheels 1b. An interlocking pin 11b is provided at a suitable point on the inner wall of the ratchet cup 11. The interlocking pin 11b extends at a right angle relative to the plane of the inner wall and extends in a loosely-fit fashion through an interlocking hole 14b formed through the lock arm 14 and an arcuate slot 3d formed through the side wall 3a. A bush 12 made for example of a resin is interposed between the ratchet cup 11 and the side wall 3a, thereby preventing the ratchet cup 11 from contacting the side wall 3a and ensuring smooth rotation for the ratchet cup 11.

Further, sectorial holes 3c, 3c are formed through the side walls 3a, 3a of the retractor casing 3 at locations somewhat remote downwardly and rearwardly from the corresponding spindle holes 3b, 3b as viewed in FIG. 1. Both end portions of the above-mentioned lock lever 13, which engages the cog wheel 1b to restrain rotation of the reel 1, are inserted in the sectorial holes 3c, 3c, respectively. The interlocking lugs 13a, 13a are respectively provided adjacent to both ends of the lock lever 13. These interlocking lugs 13a, 13a engage a desired pair of cogs of the cog wheels 1b, 1b. Both end portions of the lock lever 13 are each formed into a plate-like shape, the transverse cross-section of which is rectangular. Accordingly, the lock lever 13 is supported in a loosely fit fashion turnably over the angle $a$ defined by the two radii of each of the sectorial holes 3c, 3c.

Figure 4A:
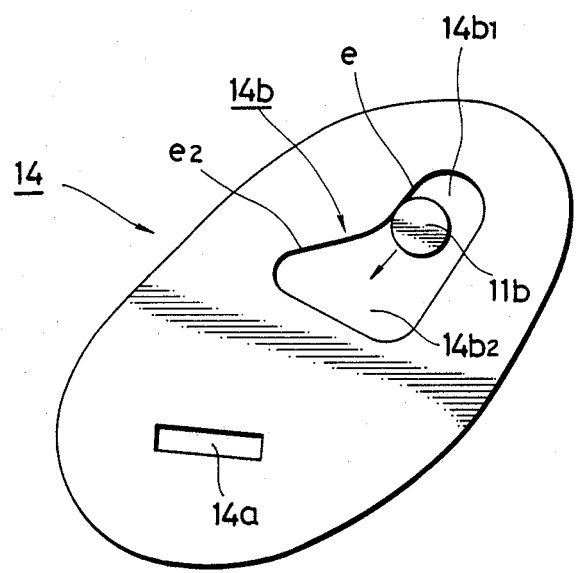

The lock lever 3 is formed at one end portion thereof, which is located on the side of the clutch mechanism, into two steps. The lock arm 14 is fit over an end portion 13b which extends out from the side wall 3a. As illustrated in FIG. 4a, a rectangular hole 14a is formed through the lock arm 14 at a location adjacent to one end of the lock arm 14. The end portion 13b of the lock lever 13 is fit in the rectangular hole 14a. In adjacent to the other end of the lock arm 14, there is formed an interlocking hole 14b 1 which is in turn formed of an elongated circular part $14b_1$ and an enlarged part $14b_2$ including an allowance A for absorbing and eliminating the spring force of a below-described lock lever spring 15. The interlocking pin 11b of the ratchet cup 11 is loose fit in the enlarged part $14b_2$. When the interlocking edge 7a of the pawl 7, which edge 7a is in a position projected out from the inertia block 9, is brought into engagement with one of the ratchet teeth 11a, the ratchet cup 11 is caused to rotate together with the spindle 2 and the interlocking pin 11b engages the elongated circular part $14b_1$ of the interlocking hole 14b, whereby the lock arm 14 is turned counterclockwise about the rectangular slot 14a while maintaining its engagement with the interlocking pin 11b. Here, the lock lever 13 is also turned together with the lock arm 14.

The lock lever spring 15 is interposed as first biasing means between the lock lever 13 as a lock member and the side wall 3a, thereby biasing the lock lever 13 in the non-engagement direction (i.e., in the clockwise direction) relative to the cog wheels 1b, 1b. In the illustrated first embodiment, the lock lever spring 15 is hooked at one end thereof in a retainer hole 13c (see, FIG. 1) formed through the end portion 13b of the lock lever 13 which end portion extends out from the side wall 3a, while the other end of the lock lever spring 15 is hooked in a retainer hole 3e formed through the side wall 3a. The lock lever spring 15 also urges the lock arm 14 in such a way that the lock arm 14 is normally caused to turn clockwise. Therefore, the lock arm 14 is caused to turn against the spring force of the lock lever spring 15 when the pawl 7 projects out and the ratchet cup 11 rotates clockwise.

Since the interlocking pin 11b provided at a right angle on the ratchet cup 11 extends through the interlocking hole 14b into the arcuate slot 3d of the side wall 3a, the position of the lock arm 14 turned most clockwise is determined by the position where the interlocking pin 11b is brought into abutment with the upper end edge of the arcuate slot 3d. The length of the arcuate slot 3d is set in such a way that a gap is still left between the lower end edge of the arcuate slot 3d and the interlocking pin 11b when the lock lever 13 has been brought into engagement with the cog wheels 1b.

Figure 5A:
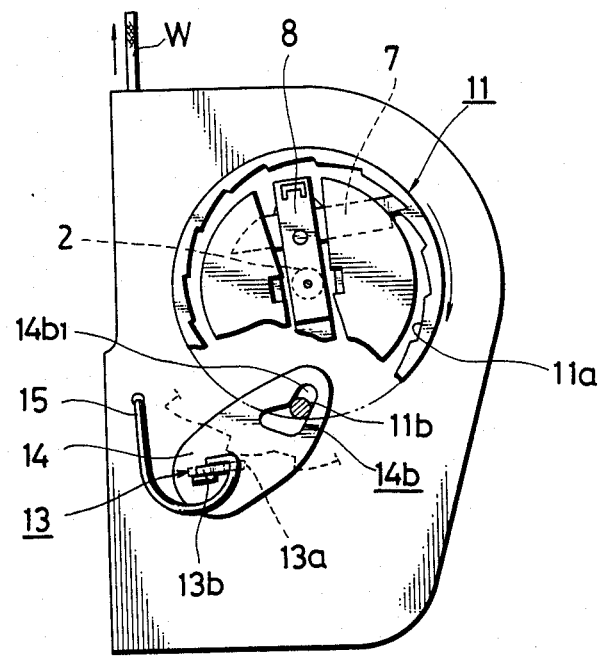
FIGS. 5a-5b are side views of the first embodiment, showing the operation of the first embodiment.
Figure 5B:
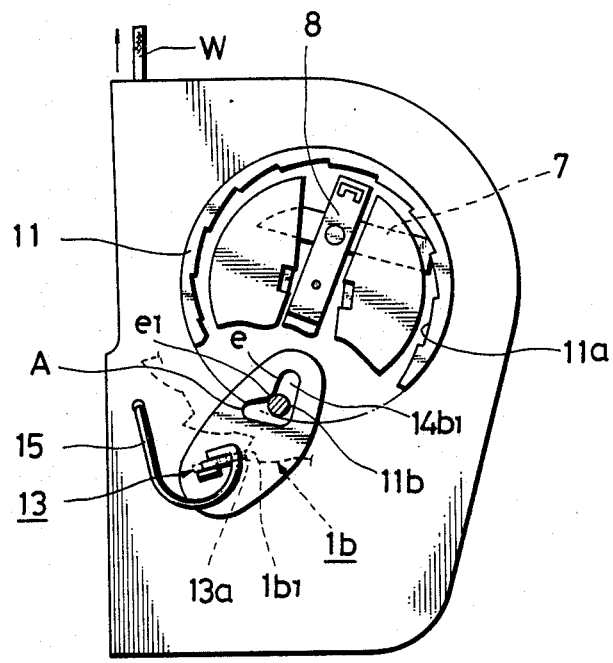

Operation of the above-constructed emergency locking retractor of the first embodiment will next be described. Usual emergency locking operation is described first of all. When the webbing W is pulled out abruptly due to a collision or the like and the rotary angular acceleration of the spindle 2 hence exceeds a predetermined value while the seat belt system is in use, the inertia block 9 mounted in the loosely fit fashion on the spindle 2 cannot follow the rotation of the spindle 2 due to its own inertia and develops a delay in rotation relative to the spindle 2. Namely, the spindle 2 rotates to an advanced side relative to the inertia block 9. As a result, the pawl 7 supported rotatably on the shaft 6a of the flange 6 is caused to project out from the inertia block 9 and is hence brought into engagement with one of the ratchet teeth 11a provided on the inner wall of the ratchet cup 11. Accordingly, the ratchet cup 11 and spindle 2 rotate together in the clockwise direction as shown in FIG. 5a. Upon rotation of the ratchet cup 11, the interlocking pin 11b maintained in engagement with the elongated circular part $14b_1$ of the interlocking hole 14b of the lock arm 14 is caused to move along one edge e of the elongated circular part $14b_1$. At the same time, the lock arm 14 is caused to turn counterclockwise against the spring force of the lock lever spring 15 while maintaining the engagement between the lock arm 14 and the ratchet cup 11. When the interlocking pin 11b reaches the end $e_1$ of the edge e as depicted in FIG. 5b, the lug tip $13a_1$ of each lug 13a of the lock lever 13 begins to undergo meshing engagement with the cog tip $1b_1$ of one of cogs of the cog wheel 1b. At this time point, the rotation of the cog wheel 1b, i.e., the spindle 2 has not been completely restrained.

Figure 4B:
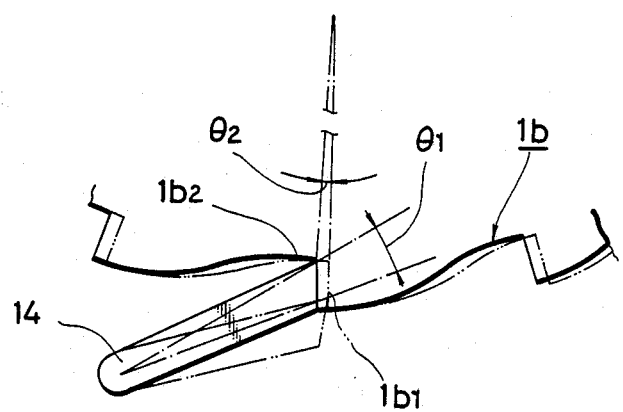
Figure 5C:
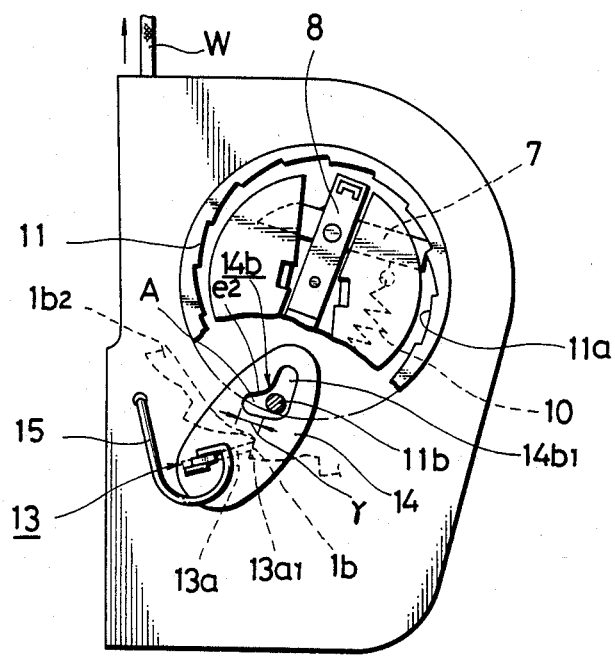
Figure 5D:
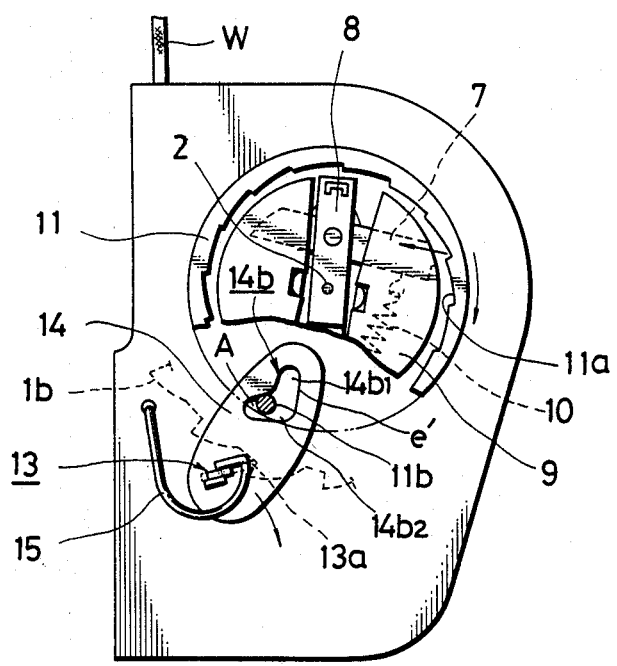

Thereafter, by a slight rotation of the cog wheel 1b, the lock lever 13 is forcedly guided to the cog root $1b_2$ of the cog wheel 1b as shown in FIG. 5c. Therefore, the lock arm 14 is turned further over an angle $\theta_1$ in the counterclockwise direction as shown in FIG. 4b. It is here that the rotation of the spindle 2 has been completely restrained. At this time, the cog wheel 1b (namely, the spindle 2) is also turned clockwise over an angle $\theta_2$ and the ratchet cup 11, which is connected to the spindle 2, is also turned together with the cog wheel 1b. Since the turning angle $\theta_1$ of the lock arm 14 is greater, a gap equal to $\gamma$ is left between the edge $e_2$ of the interlocking hole 14b and the interlocking pin 11b as illustrated in FIG. 5c. At this time, the ratchet cup 11 is under the influence of the pulling force of the helical spring 10 by way of the pawl 7. The ratchet cup 11 thus turns clockwise so as to eliminate the gap $\gamma$, resulting in a state shown in FIG. 5d.

On the other hand, the pawl 7 attached to the spindle 2 cannot follow the above-described operation because the spindle 2 is completely restrained from rotation. The connection between the pawl 7 and the ratchet cup 11 is therefore released and the pawl 7 is then caused to return to the state shown in FIG. 3 by the pulling force of the helical spring 10, thereby reaching the state depicted in FIG. 5d.

When the emergency state is finished and the pulling force is no longer applied to the webbing, the spindle 2 is rotated counterclockwise under the biasing force of the coil spring 4 so as to take up the webbing W. When the cog wheel 1b is turned counterclockwise and its engagement with the lock lever 13 is hence released, the lock arm 14 is turned clockwise by the spring force of the lock lever spring 15 so that the lock lever 13 is completely released from the cog wheel 1b and at the same time, the ratchet cup 11 is turned counterclockwise so as to cause the interlocking pin 11b to return to its initial position in the elongated circular part 14b$_1$ of the interlocking hole 14. Thereafter, the release of the webbing at a usual speed can be practiced smoothly because the pawl 7 has already retreated to its non-engagement position.

An operation for releasing the above-mentioned lockup state will next be described. Incidentally, a lockup state occurs, for example in the following manner. When the occupant releases the buckle, the webbing is rapidly taken up over its entire length within the retractor and the winding rotation (the counterclockwise rotation) of the spindle 2 is then caused to stop suddenly, the inertia block 9 overruns in the webbing-winding direction owing to its own inertia and then turns counterclockwise relative to the spindle 2. As a result, the pawl 7 is caused to project out to a point where the pawl 7 is engageable with one of the ratchet teeth 11a of the ratchet cup 1. Since the spindle 2 slightly turns in the webbing-releasing direction (i.e., clockwise) as a counterreaction to its sudden stop, the pawl 7 which is rotatable together with the spindle 7 engages one of the ratchet teeth 11a of the ratchet cup 11 and is maintained in its engaged state. Even if a pulling force is applied to the webbing W, any further release of the webbing W is not feasible because the spindle 2 and ratchet cup 11 are connected together as illustrated in FIG. 5a, the ratchet cup 11 is hence caused to turn clockwise, and the lock lever 13 is accordingly brought into engagement with the cog wheel 1b so as to restrain the spindle 2 from any further rotation in the webbing-releasing direction as depicted in FIG. 5b. It is also impossible to take up the webbing W any further, because it has already been in its fully-wound state. The lockup state means a state in which neither webbing-winding rotation nor webbing-releasing rotation is permitted.

In the lockup state, a substantial difference in phase exists between the phase (see, FIG. 5a) of the spindle 2 upon engagement of the pawl 7 with the ratchet cup 11 and that (see, FIG. 5b) of the spindle 2 upon initiation of engagement between the lock lever 13 and cog wheel 1b. It is therefore possible to cause the spindle 2 and ratchet cup 11 to turn clockwise over the difference in phase so that the webbing W is released. When the webbing W is released in the lockup state, the state changes, through the stages shown respectively in FIGS. 5a and 5b, to the state depicted in FIG. 5d in which the γ has been formed. Upon formation of the gap γ, the ratchet cup 11 is caused to turn clockwise and the pawl 7 is pulled back by the pulling force of the helical spring 10 in the same manner as in the above-described usual state. As a result, the pawl 7 is caused to disengage from the ratchet teeth 11a to escape from the lockup state.

Figure 6:
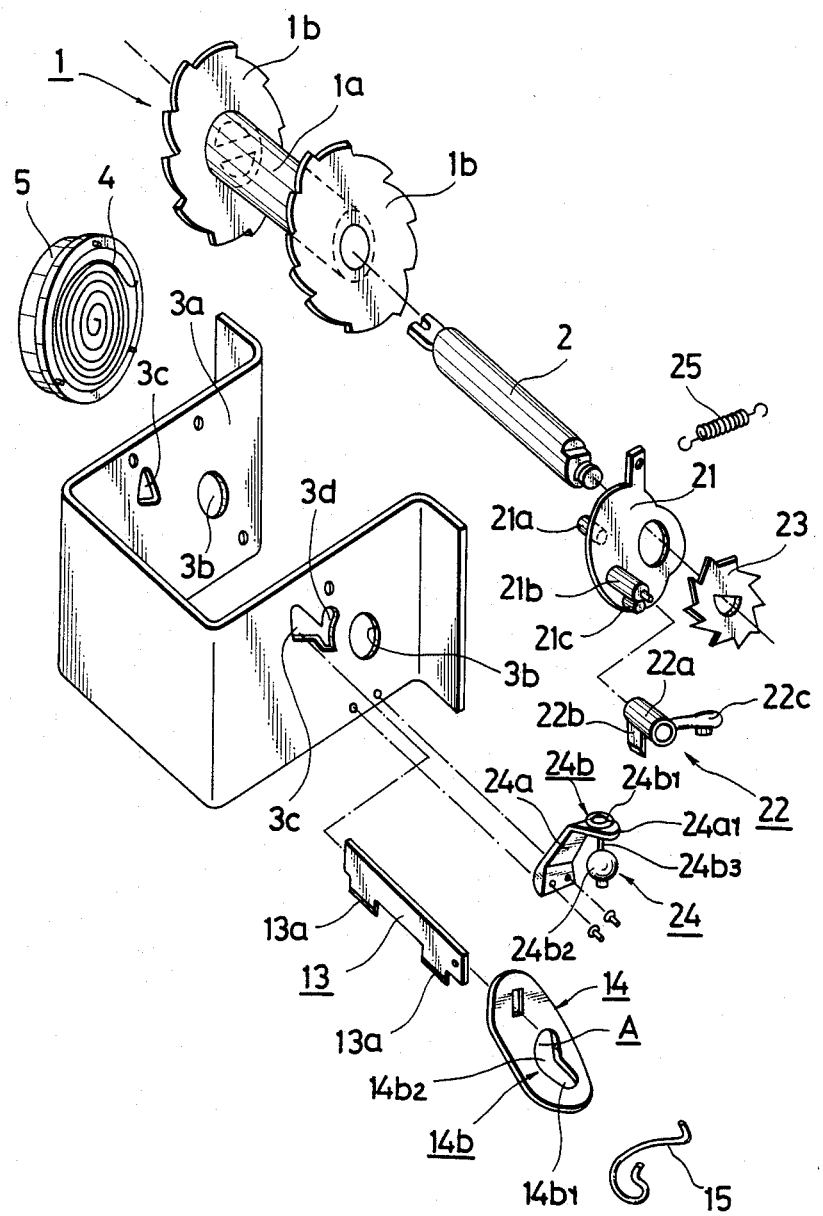
FIG. 6 is an exploded perspective view of an emergency locking retractor according to the second embodiment of this invention.

The second embodiment of this invention will next be described with reference to FIG. 6, in which like reference numerals identify like elements of structure in the first embodiment and description of such like elements are omitted. The emergency locking retractor according to the second embodiment of this invention is of the vehicle sensing type. Accordingly, the emergency locking retractor of the second embodiment is different from the webbing-sensing emergency locking retractor of the first embodiment in the transmission means for selectively transmitting rotation of the spindle 2 to the lock lever 13 as the lock member in accordance with the change in vehicle acceleration in the event of an emergency. In FIG. 6, a movable plate 21 is loosely fit on an end portion of the spindle 2. The end portion extends out from the side wall 3a. A pin 21a is provided at a right angle on the inner surface of the movable 21, which inner surface is located in opposition to the side wall 3a. The pin 21a extends into the arcuate slot 3d formed through the side wall 3a. At a suitable location on the outer surface of the movable plate 21, there is provided at a right angle a support pin 21b which rotatably supports a pawl member 22. At a location underneath the support pin 21b, a stopper 21c is also provided at a right angle to prevent excessive rotation of the pawl member 22. The pawl member 22 is provided, at suitable locations on the peripheral wall of a cylindrical main portion 22a which is rotatably fit over the pin 21b, with the pawl 22b and a lever 22c which causes a below-described inertia member 24 for sensing each acceleration of the vehicle, namely, the casing 3 mounted on the vehicle and the pawl 22b to ccoperate. On an end portion of the spindle 2 which end portion extends out from the plate 21, there is fixedly mounted a ratchet gear having the same number of cogs as the cog wheel 1b. The pawl 22b is detachably engageable with the ratchet gear 23. Further, a synchronizing mechanism similar to that incorporated in the first embodiment is also provided between the ratchet gear 23 and cog wheel 1b.

Figure 7:
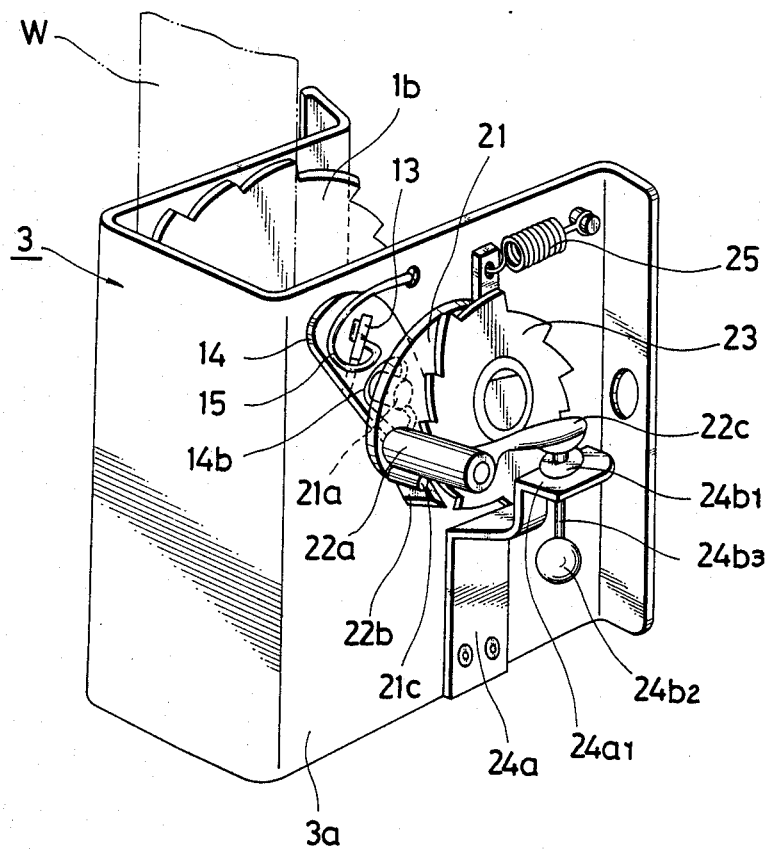
FIG. 7 is a side view of the second embodiment.

In addition, an inertia member 24 is provided on the side wall 3a at a prescribed position. As illustrated in FIG. 7, the inertia member 24 is composed of an arm 24a attached fixedly to a suitable position of the side wall 3a and a pendulum 24b constructed by connecting a disk 24b$_1$ and weight 24b$_2$ by means of a bar 24b$_3$. The pendulum 24 is swingably suspended with its bar 24b$_3$ extending in a loosely fit fashion through a hole (not illustrated) formed through a horizontal extension 24a$_1$ of the arm 24a. A tip portion of the lever 22 of the pawl member 22 lies on the disk 24b$_1$. The lever 22 detects each swinging motion of the pendulum 24b and turns counterclockwise.

Similar to the first embodiment, the lock arm 14 through which the interlocking hole 14b is formed including the allowance A is fixedly mounted on one end of the lock lever 13. Through the interlocking hole 14b, the pin 21a of the movable plate 21 extends so as to transmit each rotation of plate 21 to the lock lever 13. In addition, the lock lever spring 15 is interposed between said one end of the lock lever 13 and the associated side wall 3a, thereby biasing the lock lever 13 clockwise and also urging the lock arm 14 counterclockwise by way of the lock arm 14. In the illustrated second embodiment, a helical spring 25 (i.e., second biasing means) one end of which is fixed to a suitable position on the side wall 3a is fixedly attached at the other end thereof to a suitable location on the inner surface of the plate 21. The inner surface of the plate 21 is the surface opposite to the surface on which the support pin 21b is provided at a right angle. The spring 25 biases the plate 21 clockwise. Here, the pulling force of the helical spring 25 is set at a level considerably smaller than the spring force of the lock lever spring 15 which biases the plate 21 counterclockwise by way of the lock arm 14. Therefore, the plate 21 is biased counterclockwise in the normal state in which the pin 21a is positioned within the elongated circular part $14b_1$ of the interlocking hole 14b.

Operation of the above-constructed vehicle sensing emergency locking retractor of the second embodiment will hereinafter be described.

Figure 8A:
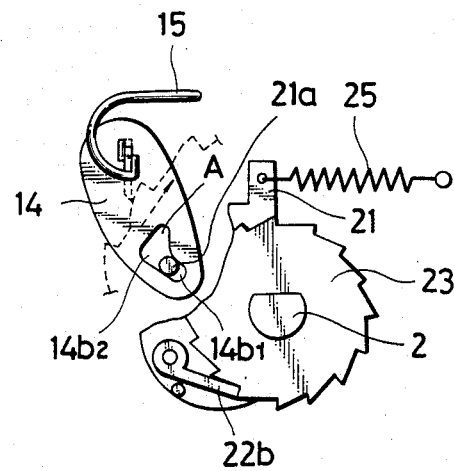
FIGS. 8a through 8d schematically illustrate the operation of the second embodiment.

Reference is now made to FIG. 7. When the vehicle is suddenly stopped due to sudden application of its brakes, a collision or the like, the pendulum 24b detects it and is thus swung due to its own inertia. The disk $24b_1$ is thus tilted to lift the lever 22c. As a result, the pawl member 22 turns counterclockwise as a whole, thereby bringing the tip of the pawl 22b into engagement with one of the cogs of the ratchet gear 23. In the mean time, the occupant is caused to sway frontward due to his own inertia upon the sudden halt of the vehicle body and the webbing W is hence pulled out rapidly. As a result, the cog wheel 1b and ratchet gear 23 are both rotated at a rapid speed. Therefore, the pawl 22b is brought into firm engagement with the ratchet gear 23 as depicted in FIG. 8a. The rotation of the ratchet gear 23 is transmitted to the plate 21 by way of the support pin 21b, thereby causing the plate 21 to turn clockwise.

The rotation of the plate 21 is then transmitted to the lock arm 14 by way of the pin 21a to turn the lock bar 13 counterclockwise against the spring force of the lock lever spring 15. Accordingly, as illustrated in FIG. 8, the lug 13a begins to engage the cog tip $1b_1$ (see, FIG. 4b) of the cog wheel 1b and the engagement between the pin 21a and lock arm 14 is released. By a subsequent slight rotation of the cog wheel 1b, the lug 13a is guided to the cog root to establish firm engagement therebetween as shown in FIG. 8c. The spindle 2 is therefore completely restrained from turning in the webbing-releasing direction and similar to the first embodiment, the gap γ is formed in the allowance A because the turned angle of the lock arm 14 is greater than that of the plate 21. Since the engagement between the lock arm 14 and pin 21a has been released by the above time point, the plate 21 is not under the influence of the spring force of the lock lever spring 15. As depicted in FIG. 8d, the plate 21 is turned clockwise separately from the ratchet gear 23 by the pulling force of the helical spring 25 and owing to its own gravity, the pawl 22b separates from the ratchet gear 23 and turns until it contacts the stopper 21c. Therefore, the engagement of the ratchet gear 23 and the pawl member 22 is released and at the same time, the pawl member 22 returns to its initial normal state. After the emergency state has been eliminated, the winding of the webbing W has started and the lock of the retractor has thus been released by the spring force of the lock lever spring 15, the usual release and winding of the webbing W can be practiced smoothly.

Figure 8B:
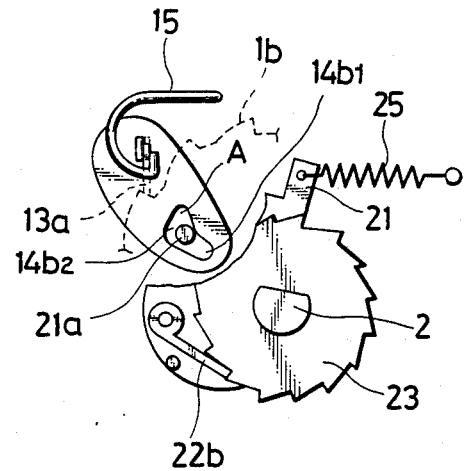
Figure 8C:
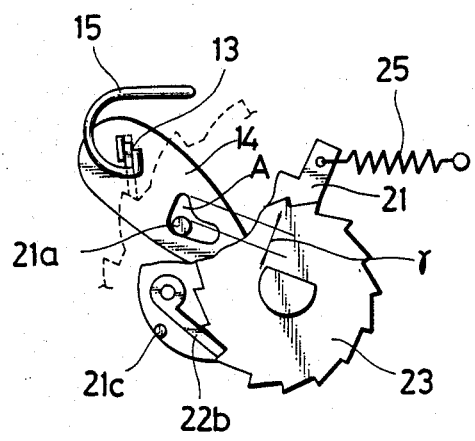
Figure 8D:
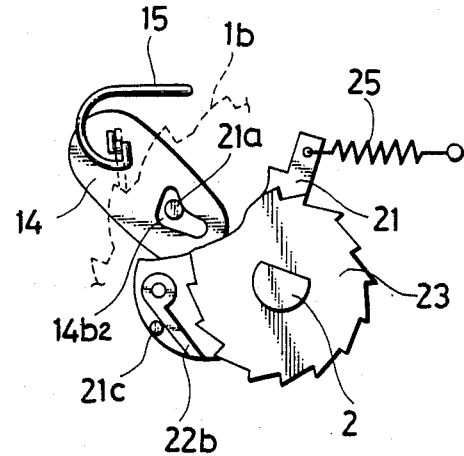

Since the interlocking hole 14b including the allowance A is formed through the lock arm 14 in much the same way as in the above-described first embodiment, the pin 21a has advanced in the enlarged part $14b_2$ of the interlocking hole 14b as shown in FIG. 8b when the lock lever 13 has firmly engaged the cog wheel 1b. Therefore, the spring force of the lock lever spring 15 is not transmitted to the plate 21. Even if a lockup state takes place, the resultant lockup state can be easily released by going through with the above-mentioned series of locking operations. When the webbing is pulled out slightly from the lockup state, the introductory stage of the locking operation is started upon engagement of the interlocking pin 21a and lock arm 14. After that, the above-mentioned operation is allowed to proceed as the webbing is released. As a result, the pawl member 22 separates from the ratchet gear 23 to release the lockup state as shown in FIG. 8d. Owing to the provision of the helical spring 25 in the second embodiment, when the spring force of the lock lever spring 15 is reduced to a level smaller than the pulling force of the helical spring 25, the plate 21 is caused to turn clockwise to ensure the separation of the pawl 22b from the ratchet gear 23. The lockup state is released without failure in the above manner, thereby permitting normal winding and release of the webbing.

Figure 9:
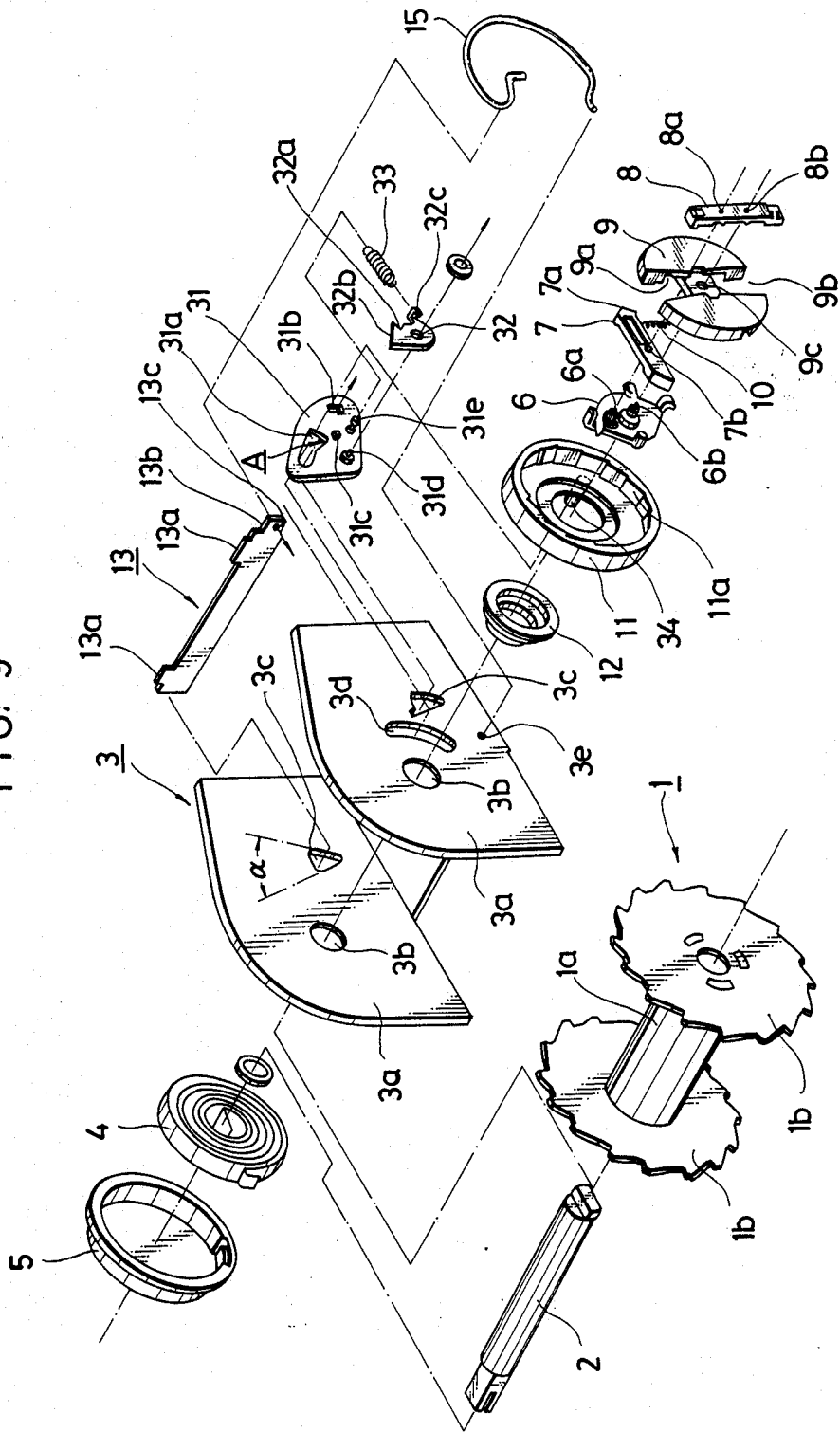
FIG. 9 is an exploded perspective view of an emergency locking retractor according to the third embodiment of this invention.
Figure 10:
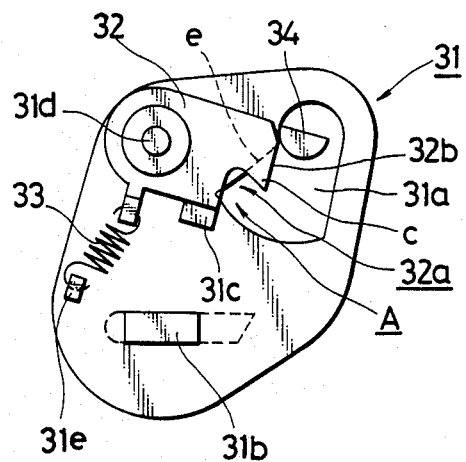
FIG. 10 is a schematic fragmentary view of the third embodiment.

Some other embodiments of this invention will next be described. In the third embodiment shown in FIG. 9, the automatic locking retractor is designed in such a way that the engagement between the interlocking pin 34 and the lock arm 31 is maintained until the tips of lugs of the lock lever 13 reach the roots of a desired pair of cogs of the corresponding cog wheels 1b and the engagement of lock lever 13 and the cog wheels 1b has been completed. As shown in FIGS. 9 and 10, the lock arm 31 defines at prescribed positions a substantially sectorial interlocking hole 31a and an insertion slot 31b in which the lock lever 13 is inserted. At prescribed positions of the lock arm 31, there are also provided, at right angles, a stopper 31c and support pin 31d for a below-described interlocking member 32 and a retainer pin 31e for the helical spring 33. On the support pin 31d, there is rotatably supported the interlocking member 32 defining a recess 32a and a sliding flat surface 32b at a tip portion thereof. A retainer prong 32c is also formed on the interlocking member 32. The helical spring 33 hooked at one end thereof on the retainer pin 31e of the lock arm 31 is hooked on the other end thereof on the retainer prong 32c. Accordingly, the pulling force of the helical spring 33 is applied to the interlocking member 32 so that the interlocking member 32 is urged clockwise. An interlocking pin 34 having a semicircular transverse cross-section is on the other hand provided at a right angle on the ratchet cup 11. This interlocking pin 34 extends in the above-described interlocking hole 31a. Here, the size of the interlocking hole 31a is set in such a way that the allowance A is provided to permit free movement of the interlocking pin 34. The remaining structure is the same as the first embodiment shown in FIG. 1.

Figure 11A:
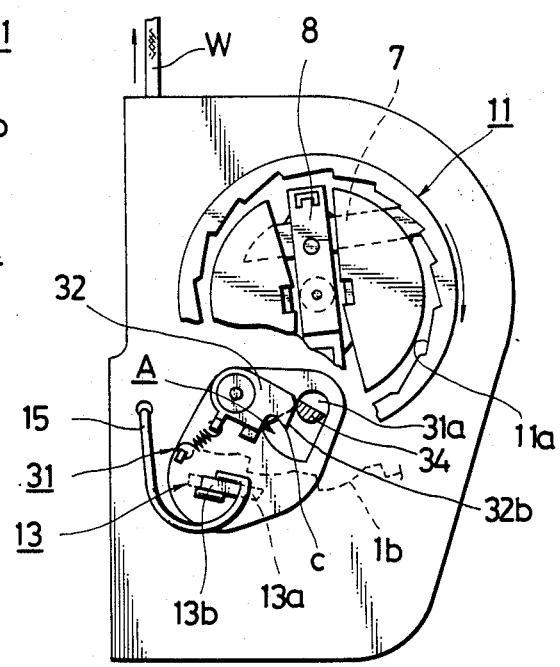
FIGS. 11a through 11d are partially cut-off schematic side views of the third embodiment.
Figure 11B:
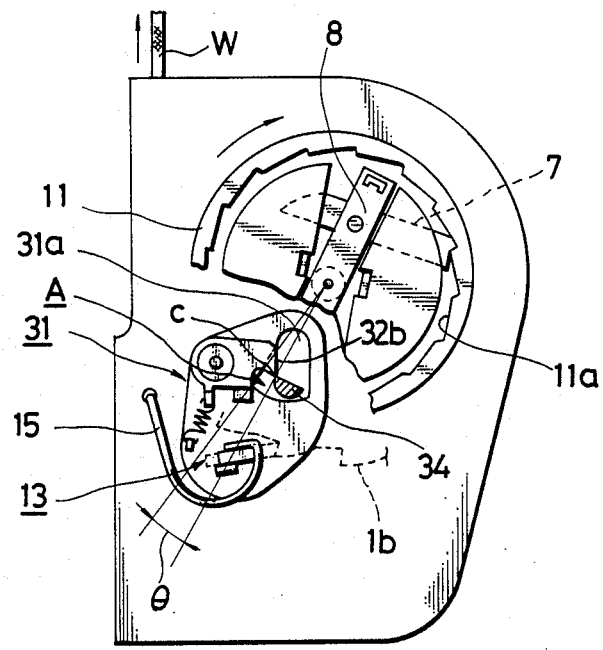
Figure 11C:
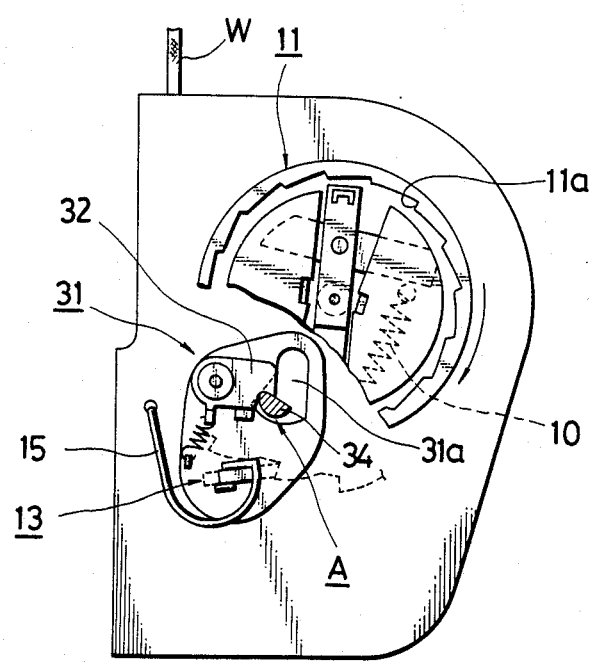
Figure 11D:
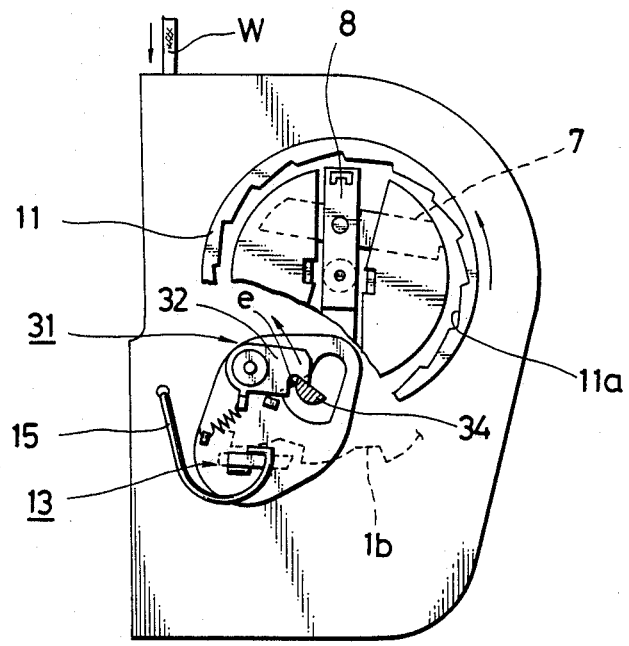

A lockup-releasing operation of the emergency locking retractor in the third embodiment is carried out in the following manner. When a lockup state occurs by a certain cause, the edge of the pawl 7 and one of the teeth 11a of the ratchet cup 11 are in an engaged state as depicted in FIG. 11a. When the webbing W is forcedly pulled out from the above state, the ratchet cup 11 is caused to turn clockwise and at the same time, the interlocking pin 34 assembled as a unitary member with the ratchet cup 11 is caused to slide downwardly relative to the interlocking member as viewed on the drawing while being maintained in contact with the sliding flat surface 32b of the interlocking member 32, thereby causing the lock lever 13 to turn counterclockwise against the spring force of the lock lever spring 15 by way of the lock arm 31. When the webbing W is pulled out further and as illustrated in FIG. 11b, the tips of the lugs of the lock lever 13 are thus caused to reach the roots of a desired pair of cogs of the cog wheels 1b to complete their mutual engagement, the interlocking pin 34 reaches a boundary shoulder c between the recess 32a and the flat surface 32b and is now ready to advance into the recess 32a. Since a rotary force as a component of the pulling force of the helical spring 10 is applied to the ratchet cup 11 in the above state as mentioned above, the ratchet cup 11 and interlocking pin 34 are caused to turn clockwise over an angle θ. Since the pawl 7 cannot fully follow the rotation of the ratchet cup 11 and interlocking pin 34 due to the complete restraint of the spindle 2 from its rotation, the pawl 7 is separated from the ratchet teeth 11a to release the lockup state. Since the interlocking pin 34 is formed in the form of a semicylindrical shape, the operation ranging from the completely locked stage depicted from FIG. 11b to the release of the lockup state by the rotation of the ratchet cup 11 shown in FIG. 11c can be performed promptly without failure. When the webbing W is taken up further and the lock arm 31 is caused to turn, the interlocking pin 34 is caused to slide back to its original position along the edge e (see, FIG. 10) of the interlocking hole 31a while causing the interlocking member 32 to turn counterclockwise. In the above manner, the lockup state is completely released and thereafter, the usual winding and releasing operation can be practiced smoothly.

Figure 12:
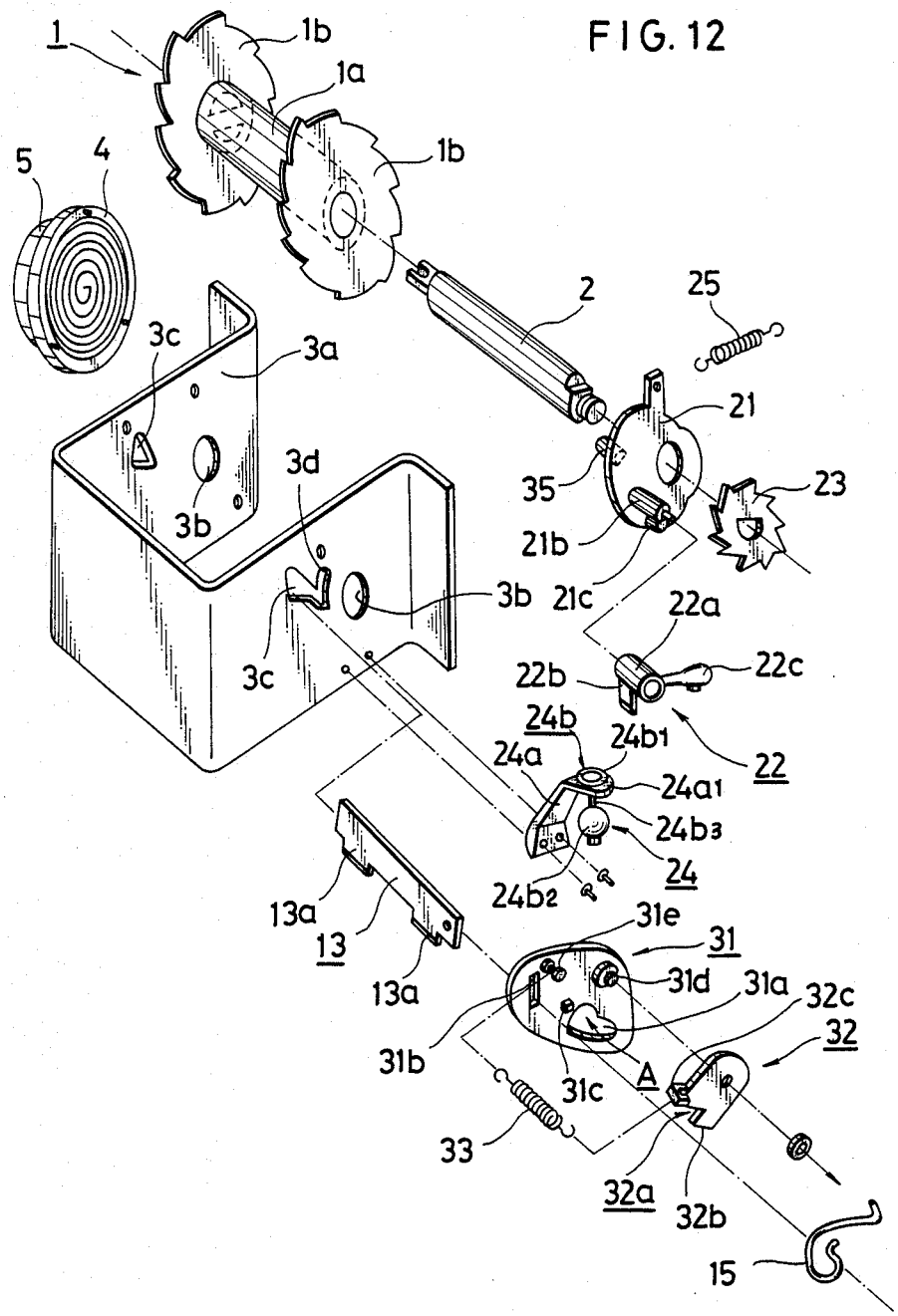
FIG. 12 is an exploded perspective view of an emergency locking retractor according to the fourth embodiment of this invention.

The fourth embodiment shown in FIG. 12 has such a structure that the interlocking operation making use of the interlocking member 32 in the third embodiment is incorporated in the vehicle sensing emergency locking retractor depicted in FIG. 6. Accordingly, an interlocking pin 35 having a semicircular transverse cross-section is provided at a right angle on the plate 21.

Figure 13A:
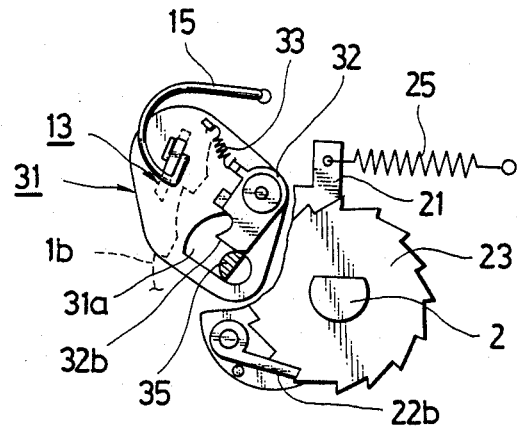
FIGS. 13a through 13c schematically illustrate the operation of the fourth embodiment.
Figure 13B:
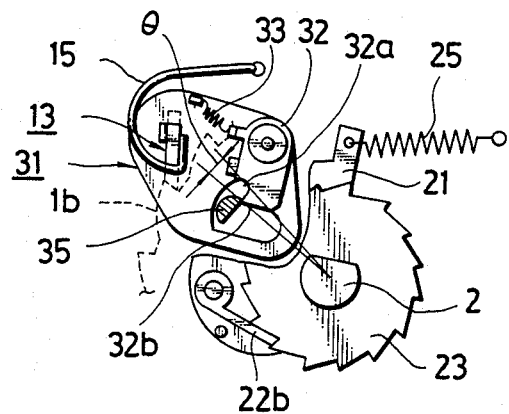
Figure 13C:
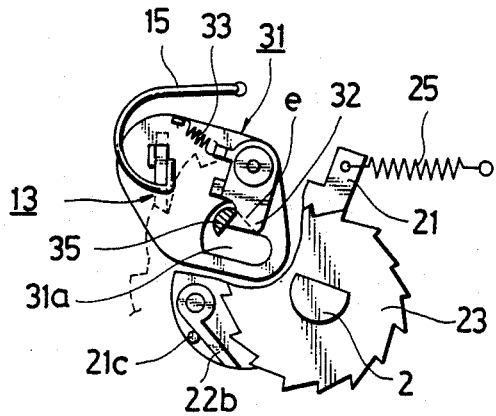

A lockup-releasing operation of the emergency locking retractor in the fourth embodiment is effected in the following manner. When the webbing W is forcedly pulled out from such a lockup state as shown in FIG. 13a, the plate 21 is caused to turn clockwise as in the second embodiment depicted in FIG. 6 and at the same time, the interlocking pin 35 assembled as a unitary member with the plate 21 is caused to slide leftwards and upwards as viewed on the drawing while being maintained in contact with the sliding flat surface 32b of the interlocking member 32, thereby causing the lock lever 13 to turn counterclockwise against the spring force of the lock lever spring 15 by way of the lock arm 31. When the webbing W is pulled out further and as illustrated in FIG. 13b, the tips of the lugs of the lock lever 13 are thus caused to reach the roots of a desired pair of cogs of the cog wheels 1b to completely restrain the spindle 2 from any further rotation, the interlocking pin 35 is caused to slide to the boundary shoulder c between the recess 32a and the flat surface 32b and is now ready to advance into the recess 32a. Since one end of the helical spring 25 is hooked on the plate 21 and a clockwise rotary force is thus applied owing to the pulling force of the helical spring 25 in the fourth embodiment, the plate 21 is caused to turn clockwise over an angle θ owing to the pulling force of the helical spring 25 as shown in FIG. 13c as soon as the spring force of the lock lever spring 15 does not affect the plate 21 after completion of the locking. The pawl 22b is hence allowed to turn clockwise by its own gravity and is separated from the ratchet gear 23 to release the lockup state. Thereafter, the lock lever 13 is turned clockwise by the lock lever spring 15 upon winding of the webbing W, so that the lock lever 13 is released from its engagement with the cog wheels 1b. In association with this disengagement of the lock lever 13 from the cog wheels 1b, the interlocking pin 35 is caused to return to its original position along the edge e of the interlocking hole 31a.

The fifth embodiment of this invention will next be described with reference to FIGS. 14 through 23. In FIG. 14 which is a partially cross-sectional front view of the fifth embodiment, a retractor casing 101 includes two side walls 102,103, which oppose to each other, and a rear wall 104 extending between the side walls 102,103. A take-up reel 105 is rotatably supported between the side walls 102,103. This take-up reel 105 is biased in the webbing-winding direction by a take-up spring (not shown) received in a take-up spring cover 106 on the side wall 102. The take-up reel 105 is composed of a bobbin 107 and a spindle 108 inserted through the bobbin 107. An end portion of a webbing W is inserted through slots formed respectively through the bobbin and spindle and a stop stick is fastened to the thus-inserted end portion of the webbing W so as to avoid slip-off of the webbing W. The take-up reel 105 is supported, via plastic bushes 110,111, in circular holes formed through the side walls 102,103.

A cog wheel 115 is mounted rotatably as a unitary member with the spindle 108 on an outer end portion of the spindle 108. A plurality of cogs 115a are formed at an equal interval on the outer periphery of the cog wheel 115.

On the spindle 108 and outside the cog wheel 115, there are provided, in order, a plate 116, a ratchet cup 117 as a latch member, a flange 118, a lock arm 119 as an interlocking member, and an inertia member 120. Of these, the plate 116, ratchet cup 117 and inertia member 120 are loosely fit, the flange 118 is provided rotatably together with the spindle 108, and the lock arm 119 is provided on the flange 118 in such a way that the lock arm 119 is allowed to swing within a predetermined range around a pin 118a of the flange 118 as will be described herein. Attachment of these members are effected by a plane washer 121, push nut 122, tapping screw 123 and the like. A clutch mechanism is constructed by the members 117–120.

Figure 15:
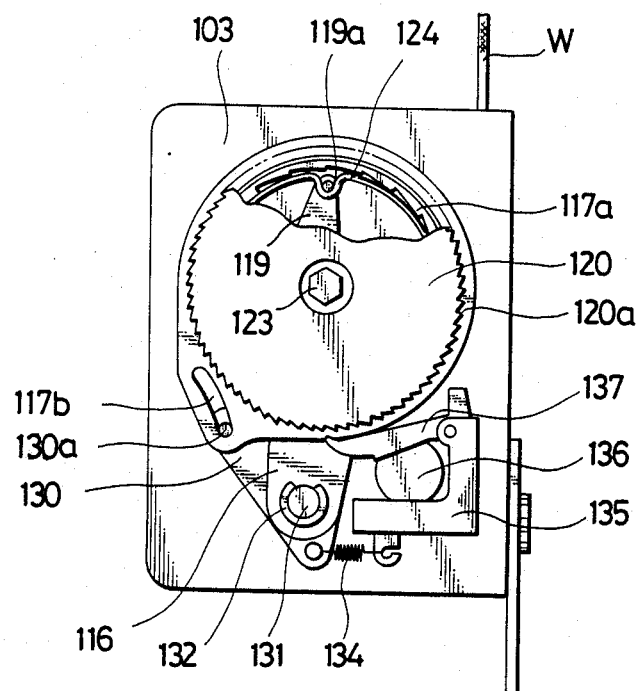
FIG. 15 is a partially cut-off side view of the fifth embodiment.

As best shown in the partially cut-off side view of FIG. 15, a friction spring 124 is provided on a pin 119a of the lock arm 119. This friction spring 124 is pressed by its own spring force against the inertia member 120.

Cogs 120a which are directed in the webbing-releasing direction are formed on the outer periphery of the inertia member 120. On the inner peripheral wall of the ratchet cup 117, there are formed teeth 117a directed in the webbing-winding direction. The teeth 117a are adapted to engage the lock arm 119. A pawl 130 is provided at a lower part of the side wall 103. An interlocking pin 130a provided with the pawl pin 130 cooperates with a cam slot 117b formed through the ratchet cup 117. The pawl 130 can assume any one of a locking position where the pawl 130 prevents the take-up reel 105 from rotating in the webbing-releasing direction, an intermediate position where the pawl 130 is in engagement with the interlocking face of one of the cogs 115a but still allows the reel 105 to rotate to a certain limited extent, and a non-locking position where the pawl 130 is maintained out of engagement from any one of the cogs 115a. The pawl 130 is provided swingably about a pin 131. The pin 131 extends from the side wall 103 to the plate 116. The plate 116 is fastened on the pin 131 by means of an E-clip 132.

The lock arm 119 is biased by sensor spring 133 (see, FIG. 3) as a second biasing member to a position where the lock arm 119 is maintained out of engagement from any one of the teeth 117a of the ratchet cup 117. On the other hand, the pawl 130 is biased by a pawl spring 134 as a first biasing member to its non-locking position.

At a lower part of the side wall 103, a sensor case 135 is also secured fixedly. A weight 136 is mounted on the sensor case 135. In addition, a sensor arm 137 is swingably provided on the sensor case 135.

Enclosing most of the above-mentioned members, a sensor cover 140 is provided on the side wall 103.

Operation of the fifth embodiment will next be described. First of all, a description will be made on the sensing of the webbing speed.

When the webbing W is pulled out at a speed faster than a predetermined value, the inertia member 120 undergoes a delay in rotation due to its own inertial relative to the spindle 108.

Figure 16:
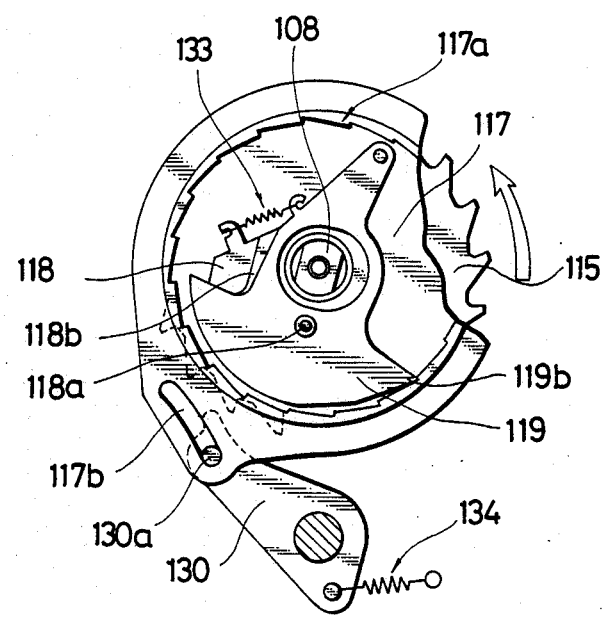
FIGS. 16 through 18 schematically illustrate the emergency locking operation of the fifth embodiment.

A force is thus transmitted from the friction spring 124, which pressed by its own spring force against the inertia member 120, to the lock arm 119 which is about to rotate together with the spindle 108 and the like in a direction indicated by an arrow in FIG. 16. The lock arm 119 is therefor caused to swing clockwise about the pin 118a of the flange 118 against the biasing force of the sensor spring 133 from the position where the lock arm 119 has been maintained in contact with the raised portion 118b of the flange 118, thereby causing the edge 119b of the lock arm 119 to engage one of the teeth 117a of the ratchet cup 117.

Figure 17:
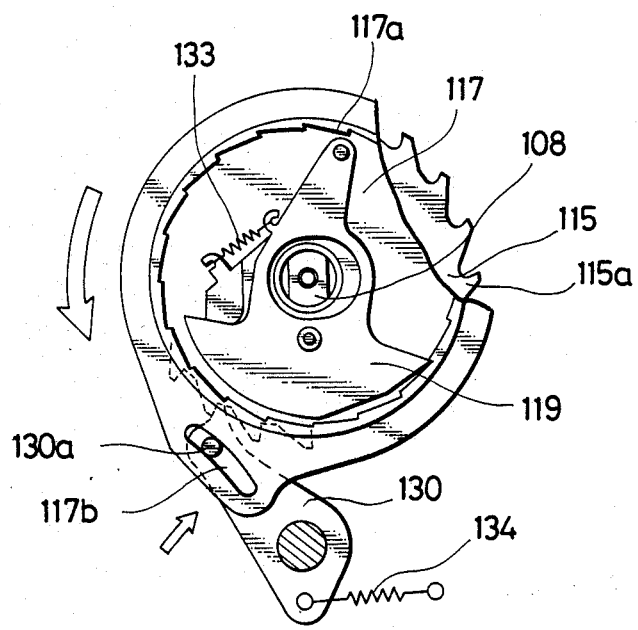

When the spindle 108 is rotated further in the webbing-releasing direction, the ratchet cup 117 begins to rotate. As illustrated in FIG. 17, the pawl pin 130a is hence guided upwardly along the left edge of the cam slot 117b so that the pawl 130 is caused to turn against the biasing force of the pawl spring 134 in a direction indicated by an arrow in FIG. 17. In the above-described manner, the pawl 130 reaches the locking position in which it is in engagement with one of the cogs 115a of the cog wheel 115. Owing to the engagement between the pawl 130 and the one of cogs 115a of the cog wheel 115, the take-up reel 105 is prevented from rotating in the webbing-releasing direction.

A description will next be made on the sensing of acceleration of a vehicle body.

Figure 18:
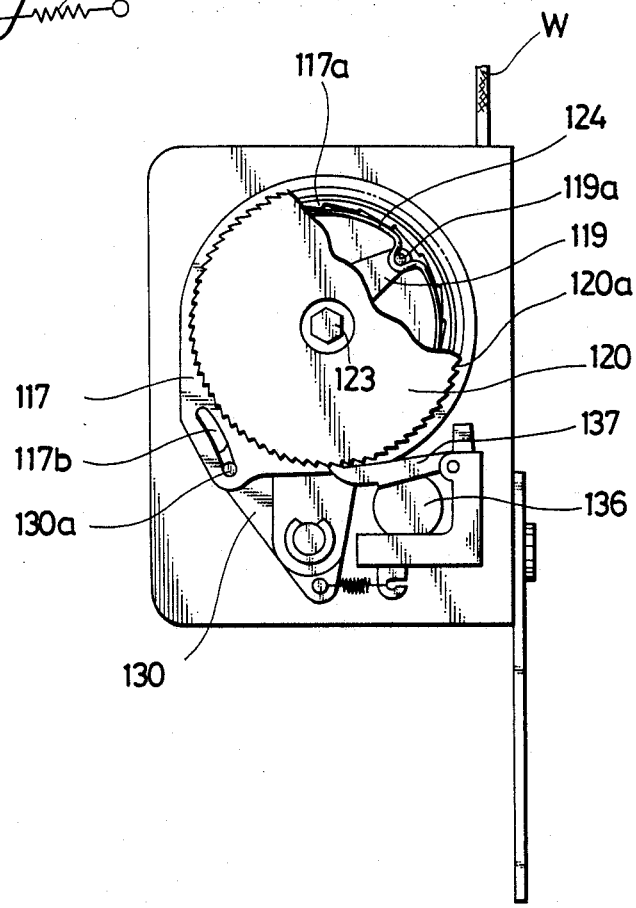

When an acceleration or deceleration is applied beyond a predetermined value to the vehicle body, the weight 36 detects it and moves so that the sensor arm 137 is lifted as shown in FIG. 18. The sensor arm 137 engages one of the cogs 120a of the inertia member 120, whereby the inertia member 120 rotating together with the spindle 108, etc. in the webbing-releasing direction is stopped.

Following the operation described with reference to FIG. 16, the lock arm 119 is then brought into engagement with one of the teeth 117a of the ratchet cup 117. In the same manner as described with reference to FIG. 17, the pawl 130 is thereafter brought into engagement with one of the cogs 115a of the cog wheel 115 to prevent the take-up reel 105 from rotating in the webbing-releasing direction.

The emergency locking operations of the emergency locking retractor of the fifth embodiment have been described above.

An operation for releasing a lockup state will next be described.

Figure 19:
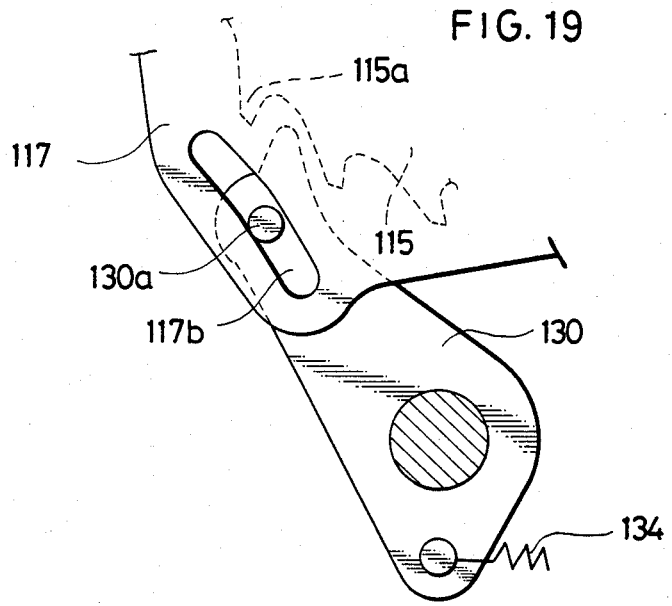
FIGS. 19 through 22 are enlarged fragmentary views of the fifth embodiment, showing the lockup avoiding operation.

Let's now assume that the webbing W is abruptly taken up over its entire length by the force of the take-up spring. Then, the take-up reel 105 is caused to stop abruptly after the thus-wound webbing W has been tightened. However, the inertia member 120 is allowed to continue its rotation in the webbing-winding direction. A relative movement thus occurs between the take-up reel 105 and the inertia member 120, so that the lock arm 119 reaches the position where the lock arm 119 is engageable with the ratchet cup 117 as shown in FIG. 16. Since the take-up reel 105 has already started turning in the webbing-releasing direction as a counter-reaction by that time, the ratchet cup 117 is also caused to start turning in the same direction. Owing to the guidance of the pawl pin 130a along the cam slot 117b, the pawl 130 is brought into a locked state in which the pawl 130 is engageable with one of the cogs 115a of the cog wheel 115 as shown in FIG. 19.

As soon as the above-mentioned first state has been reached, the energy of the counterreaction of the take-up reel 105 is absorbed and the take-up reel 105 stops. In this state, the biasing force of the pawl spring 134 is applied to the ratchet cup 117 by way of the pawl pin 130a and cam slot 117b and biases the ratchet cup 117 in the webbing-winding direction. Therefore, the engagement of the teeth 117b of the ratchet cup 117 and the edge 19b of the lock arm 19 is maintained without release.

This is the so-called lockup state.

Figure 20:
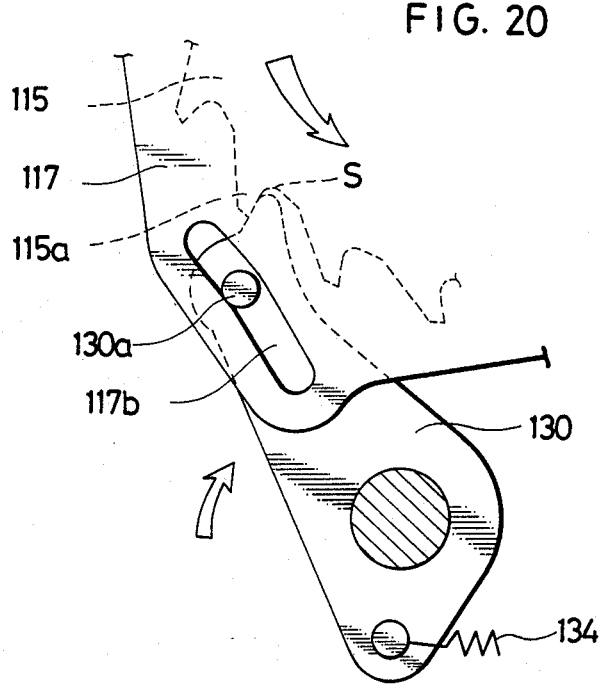
Figure 22:
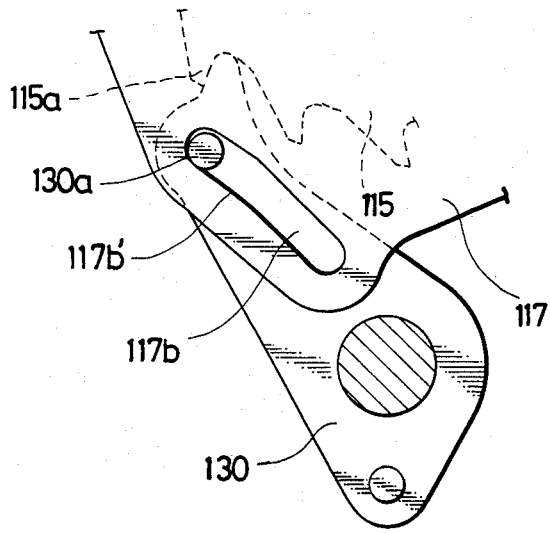

If the webbing W is pulled out in the above state, the cog wheel 115 is caused to turn in the webbing-releasing direction together with the ratchet cup 117 to reach a state shown in FIG. 20.

In the state shown in FIG. 20, at its intermediate position, the pawl 130 is actually in engagement with the cog wheel 115. Therefore, the pulling force of the pawl spring 134 is not transmitted via the interlocking pin 130a and the left edge of the cam slot 117b. The biasing force of the sensor spring 133 is however applied in such a way that the ratchet cup 117 is caused to turn in the webbing-releasing direction by way of the lock arm 119. The interlocking pin 130a is positioned at the somewhat-bent portion of the cam slot 117b, and there is left a certain gap S between the edge of the pawl 130 and the root of the cog 115a of the cog wheel 115.

Figure 21:
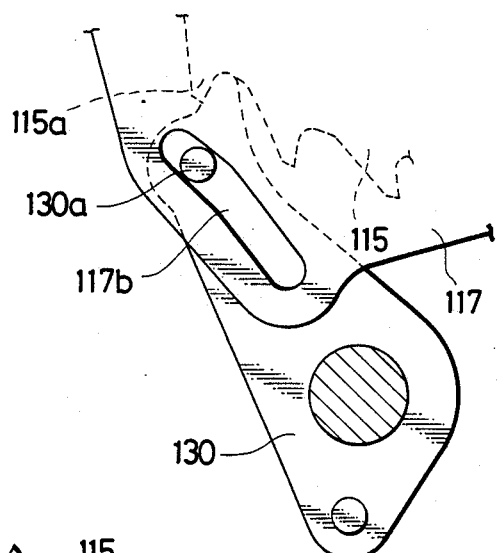

The take-up reel 105 is therefore allowed to rotate further in the webbing-releasing direction. Upon a further release of the webbing, the take-up reel 105 rotates together with the ratchet cup 117 until the edge of the pawl 130 reaches the root of the cog 115a of the cog wheel 115. Here, the take-up reel 105 and pawl 130 are not synchronized. This second state is illustrated in FIG. 21. Since the ratchet cup 117 has already been rendered free from the force of the pawl spring 134 and the force of the sensor spring 133 is solely applied to the ratchet cup 117 at this time point, the ratchet cup 117 is caused to turn slightly in the webbing-releasing direction by the latter force without any interference from the pawl pin 30a. The retractor is hence brought into a state shown in FIG. 22. Therefore, the engagement of the teeth 117a of the ratchet cup 117 and the edge 119b of the lock arm 119 is released as depicted in FIG. 23.

Figure 23:
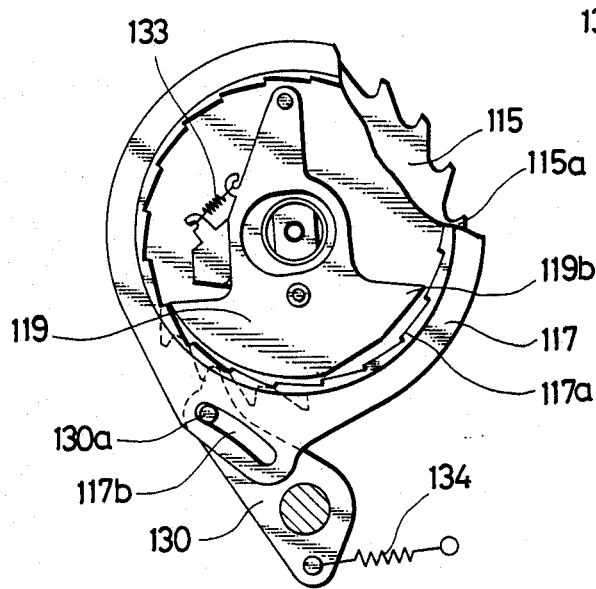
FIG. 23 schematically illustrates the lockup avoiding operation of the fifth embodiment.

When the cog wheel 115 is caused to turn slightly in the webbing-winding direction from the above state, the pawl 130 is allowed to return from the locking state in FIG. 23 to the non-locking state by the biasing force of the pawl spring 134 while causing the ratchet cup 117 to turn in the webbing-winding direction because the force preventing the rotation of the ratchet cup 117 in the webbing-winding direction is no longer applied. The left edge portion 117b' of an extension of the cam slot 117b, which extension extends upwardly from the bent portion, is not arcuate about the center of rotation of the ratchet cup 117. The cam slot 117b is formed in such a way that a force is applied to the ratchet cup 117 to cause rotation of the ratchet cup 117 in the webbing-winding direction when a force is applied from the interlocking pin 130a.

When the webbing W has been rapidly taken up over its entire length, the pawl 130 is brought into such a state that it is engageable with the cog wheel 115. Thus, the retractor is tentatively brought into a lockup state. When the webbing W is pulled out from the above state and is then rewound slightly, the pawl 130 is caused to return to its non-locking state in the same manner as described above and lockup is hence avoided successfully.

The present invention is not necessarily limited to the above-described specific examples. For example, an interlocking pin may be formed on the lock arm and an interlocking hole, which is engageable with the interlocking pin, is formed on the side of the ratchet cup.

Having now fully described the invention, it will be apparent to one of ordinary skill in the art that many changes and modifications can be made thereto without departing from the spirit or scope of the invention as set forth herein.

What is claimed is:

1. An emergency locking retractor comprising:
   a casing;
   a reel supported rotatably on the casing and biased in the webbing-winding direction, said reel including a plurality of cogs which are each equipped with an interlocking face directed in the webbing-releasing direction;
   lock means capable of assuming any one of a locking position where the lock means prevents the reel from rotating in the webbing-releasing direction, an intermediate position where the lock means is in engagement with the interlocking face of one of the cops of the reel but still allows the reel to rotate to a certain limited extent, and a non-locking position where the lock means is maintained out of engagement from any one of the cogs of the reel;
   first biasing means connected to the lock means and normally holding the lock means at the non-locking position;
   an inertia member supported on the reel, said inertia member being normally rotatable together with the reel but when the revolution speed of the reel has changed beyond a predetermined level, displaceable relative to the reel;
   second biasing means for biasing the inertia member in such a way that the inertia member is normally allowed to rotate together with the reel;
   transmission means connectable at a part thereof to the inertia member, which has undergone a displacement relative to the reel, so as to transmit rotation of the reel to the lock means, whereby the lock means is caused to return from the non-locking position to the intermediate position against the first biasing means, the biasing force of said second biasing means acting on the lock means via the transmission means so as to move the lock means toward the locking position while the inertia member and the transmission means are conencted; and
   means for releasing the connection between the lock means and the transmission menas when the lock means is forced to move to the locking position by a further slight rotation of the reel subsequent to a displacement of the lock means to the intermediatee position by the transmission means, whereby the transmission means is caused to move under the biasing force of the second biasing means so that the connection between the inertia member and the transmission means is released.

2. An emergency locking retractor as claimed in claim 1, wherein the transmission means comprises a ratchet cup rotatable about the reel and equipped with ratchet teeth, with which the inertia member is engageable, and an interlocking pin extending in parallel with the axis of the reel.

3. An emergency locking retractor as claimed in claim 1, wherein the lock means includes a pawl engageable with any one of the cogs of the reel and an interlocking pin provided on the pawl and extending in parallel with the axis of the reel.

4. An emergency locking retractor as claimed in claim 3, wherein the transmission means includes a ratchet cup provided rotatably about the reel and equipped with ratched teeth, with which the inertia member is engageable, and a cam slot in which the interlocking pin is received.

5. An emergency locking retractor as claimed in claim 4, wherein the cam slot is formed in such a way that the distance of an edge of the cam slot, which edge is located on the side more remote from the axis of the reel, from the axis of the reel increases gradually in the webbing-releasing direction.

6. An emergency locking retractor as claimed in claim 5, wherein the edge is formed of a first edge portion for guiding the pawl from the non-locking position to the intermediate position and a second edge portion serving as said connection releasing means for permitting rotation of the ratchet cup in the webbing-releasing direction under the action of the second biasing means when the pawl moves from the intermediate position to the locking position; and the inclination of the first edge portion is greater than that of the second edge portion, both relative to the webbing-releasing direction.

7. An emergency locking retractor as claimed in claim 2, wherein the lock means comprises:
   a lock member engageable with any one of the cogs of the reel; and
   a lock arm provided as a unitary member with the lock member and defining an interlocking hole in which the interlocking pin is received.

8. An emergency locking retractor as claimed in claim 7, wherein an edge of the interlocking hole, which edge is located on the webbing-releasing side, includes a first edge portion for guiding the lock member fromthe non-locking position to the intermediate position and a second edge portion serving as said connection releasing means for permitting rotation of the ratchet cup in the webbing-releasing direction under the action of the second biasing means when the lock member moves from the intermediate position to the locking position, and the first and second edge portions form substantially an opened V-like shape opening in the webbing-releasing direction.

9. An emergency locking retractor as claimed in claim 1, wherein the lock means is formed in an acute angle at a portion thereof where the lock means engages any one of the cogs of the reel.

10. An emergency locking retractor as claimed in claim 1, wherein each of the cogs formed on the reel is tilted from the tip thereof toward the root thereof in the webbing-winding direction.

11. An emergency locking retractor comprising:
a casing;
a reel supported rotatably on the casing and biased in the webbing-winding direction, said reel including a plurality of cogs which are each equipped with an interlocking face directed in the webbing-releasing direction;
lock means capable of assuming any one of a locking position where the lock means prevents the reel from rotating in the webbing-releasing direction, an intermediate position where the lock means is in engagement with the interlocking face of one of the cogs of the reel but still allows the reel to rotate to a certain limited extent, and a non-locking position where the lock means is maintained out of engagement from any one of the cogs of the reel;
first biasing means connected to the lock means and normally holding the lock means at the non-locking position;
a sensor member for sensing a change in speed applied to the casing;
transmission means connectable at a part thereof to the reel upon actuation of the sensor member so as to transmit rotation of the reel to the lock means, whereby the lock means is caused to move from the non-locking position to the intermediate position against the first biasing means;
second biasing means engageable with a part of the transmission means so as to bias the lock means toward the locking position with a force weaker than the first biasing means; and
means for releasing the connection between the lock means and the transmission means when the lock means is forced to move to the locking position by a further slight rotation of the reel subsequent to a displacement of the lock means to the intermediate position by the transmission means, whereby the transmission means is caused to move under the biasing force of the second biasing means so that the connection between the reel and the transmission means is released.

12. An emergency locking retractor as claimed in claim 11, wherein said retractor additionally comprises a ratchet gear provided as a unitary member with the reel and engageable with a part of the transmission means so that rotation of the reel is transmitted to the lock means by the transmission means via the ratchet gear.

13. An emergency locking retractor as claimed in claim 12, wherein the transmission means comprises:
a movable plate provided rotatably about the reel and equipped with a pin extending in parallel with the axis of the reel; and
a pawl member supported on the movable plate displaceably between a first position, where the pawl member is maintained out of engagement with the ratchet gear, and a second position where the pawl member is brought into engagement with the ratchet gear upon actuation of the sensor member.

14. An emergency locking retractor as claimed in claim 13, wherein the lock means comprises:
a lock member engageable with any one of the cogs of the reel; and
a lock arm provided as a unitary member with the lock member and defining an interlocking hole in which the pin is received.

15. An emergency locking retractor as claimed in claim 14, wherein an edge of the interlocking hole, which edge is located on the webbing-releasing side, includes a first edge portion for guiding the lock member from the non-locking position to the intermediate position and a second edge portion serving as said connection releasing means for permitting rotation of the ratchet cup on the webbing-releasing direction under the action of the second biasing means when the lock member moves from the intermediate position to the locking position, and the first and second edge portions form substantially an opened V-like shape opening in the webbing-releasing direction.

16. An emergency locking retractor as claimed in claim 11, wherein the lock means is formed in an acute angle at a portion thereof where the lock means engages any one of the cogs of the reel.

17. An emergency locking retractor comprising:
a casing;
a reel supported rotatably on the casing and biased in the webbing-winding direction, said reel including a plurality of cogs;
lock means displaceable between an engagement position, where the lock means is maintained in engagement with one of the cogs of the reel, and a non-engagement position where the lock means is maintained out of engagement from any one of the cogs of the reel;
first biasing means connected to the lock means and normally holding the lock means at the non-engagement position;
an inertia member supported on the reel, said inertia member being normally rotatable together with the reel but when the revolution speed of the reel has changed beyond a predetermined level, displaceable relative to the reel;
second biasing means for biasing the inertia member in such a way that the inertia member is normally allowed to rotate together with the reel;
transmission means connectable at a part thereof to the inertia member, which has undergone a displacement relative to the reel, so as to transmit rotation of the reel to the lock means, the biasing force of said second biasing means acting on the lock means via the transmission means so as to move the lock means towrd the locking position while the inertia member and the transmission means are connected; and
means for releasing the connection between the lock means and the transmission means when the lock means has been caused to move to the engagement position by the transmission means, whereby the transmission means is caused to move under the biasing force of the second biasing means so that the connection between the inertia member and the transmission means is released.

18. An emergency locking retractor as claimed in claim 17, wherein the transmission means comprises a ratchet cup rotatable about the reel and equipped with ratchet teeth, with which the inertia member is engageable, and an interlocking pin extending in parallel with the axis of the reel.

19. An emergency locking retractor as claimed in claim 17, wherein the lock means comprises:
 a lock member engageable with any one of the cogs of the reel; and
 a lock arm provided as a unitary member with the lock member and defining an interlocking hole in which the interlocking pin is received.

20. An emergency locking retractor as claimed in claim 19, wherein an interlocking member is attached to the lock arm, and the interlocking member is displaceable between a normal position, where the interlocking member partially covers the interlocking hole of the lock arm and forms a sliding flat surface capable of contacting with the interlocking pin of the ratchet cup for causing the lock member to move from the non-engagement position to the engagement position and a recessed portion set in from one edge of the sliding flat surface in the webbing-releasing direction in cooperation with a part of the interlocking hole of the lock arm, and a retreated position where the interlocking member is retreated from the interlocking hole of the lock arm.

21. An emergency locking retractor as claimed in claim 20, wherein said retractor additionally comprises a third biasing means for normally biasing the interlocking member toward the normal position.

22. An emergency locking retractor as claimed in claim 17, wherein the lock means is formed in an acute angle at a portion thereof where the lock means engages any one of the cogs of the reel.

23. An emergency locking retractor comprising:
 a casing;
 a reel supported rotatably on the casing and biased in the webbing-winding direction, said reel including a plurality of cogs;
 locking means displaceable between an engagement position, where the lock means is maintained in engagement with one of the cogs of the reel, and a non-engagement position where the lock means is maintained out of engagement from any one of the cogs of the reel;
 first biasing means connected to the lock means and normally holding the lock means at the non-engagement position;
 a sensor member for sensing a change in speed applied to the casing;
 transmission means connectable at a part thereof to the reel upon actuation of the sensor member, whereby rotation of the reel is transmitted to the lock means;
 second biasing means engageable with a part of the transmission means so as to bias the lock means toward the engagement position with a force weaker than the first biasing means; and
 means for releasing the connection between the lock means and the transmission means when the lock means has been caused to move to the engagement position by the transmission means, whereby the transmission means is cause to move under the biasing force of the second biasing means so that the connection between the reel and the transmission means is released.

24. An emergency locking retractor as claimed in claim 23, wherein said retractor additionally comprises a ratchet gear provided as a unitary member with the reel and engageable with a part of the transmission means so that rotation of the reel is transmitted to the lock means by the transmission means via the ratchet gear.

25. An emergency locking retractor as claimed in claim 24, wherein the transmission means comprises:
 a movable plate provided rotatably about the reel and equipped with an interlocking pin extending in parallel with the axis of the reel; and
 a pawl member supported on the movable plate displaceably between a first position, where the pawl member is maintained out of engagement with the ratchet gear, adn a second position where the pawl member is brought into engagement with the ratchet gear upon actuation of the sensor member.

26. An emergency locking retractor as claimed in claim 25, wherein the lock means comprises:
 a lock member engageable with any one of the cogs of the reel; and
 a lock arm provided as a unitary member with the lock member and defining an interlocking hole in which the interlocking pin is received.

27. An emergency locking retractor as claimed in claim 26, wherein an interlocking member is attached to the lock arm, and the interlocking member is displaceable between a normal position, where the interlocking member partially covers the interlocking hole of the lock arm and forms a sliding flat surface capable of contacting with the interlocking pin of the movable plate for causing the lock member to move from the non-engagement position to the engagement position and a recessed portion set in from one edge of the sliding flat surface in the webbing-releasing direction in cooperation with a part of the interlocking hole of the lock arm, and a retreated position where the interlocking member is retreated from the interlocking hole of the lock arm.

28. An emergency locking retractor as claimed in claim 27, wherein said retractor additionally comprises a third biasing means for normally biasing the interlocking member toward the normal position.

29. An emergency locking retractor as claimed in claim 23, wherein the lock means is formed in an acute angle at a portion thereof where the lock means engages any one of the cogs of the reel.

* * * * *